US011442726B1

(12) United States Patent
Schwarz et al.

(10) Patent No.: US 11,442,726 B1
(45) Date of Patent: Sep. 13, 2022

(54) VECTOR PACK AND UNPACK INSTRUCTIONS

(71) Applicant: INTERNATIONAL BUSINESS MACHINES CORPORATION, Armonk, NY (US)

(72) Inventors: Eric Mark Schwarz, Gardiner, NY (US); Timothy Slegel, Staatsburg, NY (US); Jonathan D. Bradbury, Poughkeepsie, NY (US); Michael Klein, Schoenaich (DE); Reid Copeland, Richmond Hill (CA); Xin Guo, Toronto (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/186,756

(22) Filed: Feb. 26, 2021

(51) Int. Cl.
*G06F 9/30* (2018.01)

(52) U.S. Cl.
CPC ........ *G06F 9/30025* (2013.01); *G06F 9/3004* (2013.01); *G06F 9/30036* (2013.01)

(58) Field of Classification Search
None
See application file for complete search history.

(56) References Cited

U.S. PATENT DOCUMENTS

| | | | |
|---|---|---|---|
| 4,141,005 A | 2/1979 | Bonner | |
| 8,195,727 B2 | 6/2012 | Lundvall et al. | |
| 9,329,861 B2 | 5/2016 | Carlough et al. | |
| 9,335,993 B2 | 5/2016 | Carlough et al. | |
| 10,203,955 B2 | 2/2019 | Valentine et al. | |
| 2012/0311550 A1 | 12/2012 | Kawahito | |
| 2013/0173891 A1 | 7/2013 | Carlough | |
| 2015/0089189 A1* | 3/2015 | Gonion | G06F 9/30032 712/4 |
| 2015/0089289 A1 | 3/2015 | Gahoi et al. | |
| 2016/0092164 A1 | 3/2016 | Bradbury et al. | |

(Continued)

FOREIGN PATENT DOCUMENTS

WO    WO9914663 A2    3/1999

OTHER PUBLICATIONS

Barik, Rajkishore et al., "Efficient Selection of Vector Instructions Using Dynamic Programming," 43$^{rd}$ Annual IEEE/ACM International Symposium on Microarchitecture, Dec. 2010, pp. 1-12.

(Continued)

*Primary Examiner* — John M Lindlof
(74) *Attorney, Agent, or Firm* — Edward J. Wixted, III; Blanche E. Schiller, Esq.; Heslin Rothenberg Farley & Mesiti P.C.

(57) ABSTRACT

Vector pack and unpack instructions are described. An instruction to perform a conversion between one decimal format and another decimal format is executed, in which the one decimal format or the other decimal format is a zoned decimal format. The executing includes obtaining a value from at least one register specified using the instruction. At least a portion of the value is converted from the one decimal format to the other decimal format different from the one decimal format to provide a converted result. A result obtained from the converted result is written into a single register specified using the instruction.

25 Claims, 14 Drawing Sheets

(56) References Cited

U.S. PATENT DOCUMENTS

| | | |
|---|---|---|
| 2016/0092165 A1 | 3/2016 | Bradbury et al. |
| 2017/0083317 A1* | 3/2017 | Ould-Ahmed-Vall et al. |
| 2018/0018172 A1* | 1/2018 | Rouban ................ G06F 9/3895 |
| 2019/0227797 A1 | 7/2019 | Heinecke et al. |
| 2020/0183688 A1 | 6/2020 | Toll et al. |
| 2020/0264890 A1 | 8/2020 | Lichtenau et al. |

OTHER PUBLICATIONS

IBM, "z/ Architecture—Principles of Operation," IBM Publication No. SA22-7832-12, Thirteenth Edition, Sep. 2019, pp. 1-2000.

Koju, Toshihiko et al., "Re-construction High-Level Information for Language-specific Binary Re-optimization," Feb. 2016, pp. 1-27.

Mell, Peter and Tim Grance, "The NIST Definition of Cloud Computing," National Institute of Standards and Technology, Information Technology Laboratory, Special Publication 800-145, Sep. 2011, pp. 1-7.

Polychroniou, Orestis et al., "Efficient Lightweight Compression Alongside Fast Scans," Mar. 2006, pp. 1-6.

Stephens, Nigel et al., "The ARM Scalable Vector Extension," IEEE Micro vol. 37, Issue 2, Mar.-Apr. 2017, pp. 1-8.

You, Yi-Ping "Vector-Aware Register Allocation for GPU Shader Processors," Feb. 2015, pp. 99-108.

Notification of Transmittal of the Inteniational Search Report and the Written Opinion of the International Searching Authority, PCT/EP2022/054053, dated Jun. 13, 2022, pp. 1-10.

\* cited by examiner

VECTOR UNPACK ZONED HIGH

VECTOR UNPACK ZONED LOW

EXECUTING AN INSTRUCTION TO PERFORM A CONVERSION BETWEEN ONE DECIMAL FORMAT AND ANOTHER DECIMAL FORMAT ~700

THE ONE DECIMAL FORMAT OR THE OTHER DECIMAL FORMAT IS A ZONED DECIMAL FORMAT ~702

THE EXECUTING INCLUDES

OBTAINING A VALUE FROM AT LEAST ONE REGISTER SPECIFIED USING THE INSTRUCTION ~704

CONVERTING AT LEAST A PORTION OF THE VALUE FROM THE ONE DECIMAL FORMAT TO THE OTHER DECIMAL FORMAT DIFFERENT FROM THE ONE DECIMAL FORMAT TO PROVIDE A CONVERTED RESULT ~706

WRITING A RESULT OBTAINED FROM THE CONVERTED RESULT INTO A SINGLE REGISTER SPECIFIED USING THE INSTRUCTION ~708

THE ONE DECIMAL FORMAT IS THE ZONED DECIMAL FORMAT AND THE OTHER DECIMAL FORMAT IS A PACKED DECIMAL FORMAT ~710

THE OBTAINING THE VALUE INCLUDES

OBTAINING A FIRST VALUE FROM A FIRST VECTOR REGISTER SPECIFIED USING AT LEAST ONE FIELD OF THE INSTRUCTION ~712

OBTAINING A SECOND VALUE FROM A SECOND VECTOR REGISTER SPECIFIED USING AT LEAST ONE FIELD OF THE INSTRUCTION ~714

CONCATENATING THE FIRST VALUE AND THE SECOND VALUE TO OBTAIN THE VALUE ~716

FIG. 7A

THE WRITING INCLUDES

DETERMINING A NUMBER OF DIGITS OF THE CONVERTED RESULT TO BE WRITTEN AS THE RESULT —720

SELECTING THE DETERMINED NUMBER OF DIGITS OF THE CONVERTED RESULT TO BE WRITTEN AS THE RESULT —722

WRITING THE SELECTED DETERMINED NUMBER OF DIGITS INTO THE SINGLE REGISTER —724

THE DETERMINING THE NUMBER OF DIGITS INCLUDES CHECKING A CONTROL SPECIFIED USING THE INSTRUCTION —726

THE SINGLE REGISTER IS A SINGLE VECTOR REGISTER —728

THE ONE DECIMAL FORMAT IS A PACKED DECIMAL FORMAT AND THE OTHER DECIMAL FORMAT IS THE ZONED DECIMAL FORMAT —730

THE CONVERTING THE AT LEAST A PORTION OF THE VALUE INCLUDES CONVERTING SELECTED DIGITS OF THE VALUE TO OBTAIN THE CONVERTED RESULT —732

THE SELECTED DIGITS INCLUDE A LEFTMOST FIFTEEN DIGITS OF THE VALUE —734

THE SELECTED DIGITS INCLUDE A RIGHTMOST SIXTEEN DIGITS OF THE VALUE

THE CONVERTING INCLUDES CONVERTING A SIGN OF THE VALUE —738　　736

THE WRITING INCLUDES WRITING THE CONVERTED RESULT TO A SELECTED PORTION OF THE SINGLE REGISTER, THE SINGLE REGISTER BEING A VECTOR REGISTER —740

FIG. 7B

VECTOR PACK AND UNPACK INSTRUCTIONS

BACKGROUND

One or more aspects relate, in general, to facilitating processing within a computing environment, and in particular, to improving such processing.

Applications executing within a computing environment provide many operations used by numerous types of technologies, including but not limited to, engineering, manufacturing, medical technologies, automotive technologies, computer processing, etc. These applications, written in a programming language, such as COBOL, represent numbers in a certain format and often have to convert from one format to another in order to perform calculations and/or present the data, as examples.

One format used to represent numbers is a packed decimal format, which may be signed or unsigned. In the packed decimal format, each byte contains two 4-bit decimal digits (D). In the signed packed decimal format, the rightmost byte contains a 4-bit sign (S) to the right of the 4-bit decimal digit.

Another format used to represent numbers is a zoned decimal format, which may be unsigned or signed. In the unsigned zoned decimal format, each byte contains two fields, a zone field in the leftmost 4-bit positions and a decimal digit in the rightmost 4-bit positions. The signed zoned decimal format (also referred to as an embedded signed zoned decimal format) is similar to the unsigned zoned decimal format except that the zone field of the rightmost byte contains a 4-bit sign. There is also a separate signed zoned decimal format, in which the sign is encoded as a separate byte and the numeric part of the value is in the unsigned zoned decimal format.

Embedded signed zoned decimal data items in, e.g., COBOL can range from 1 to 31 bytes to encode 1 to 31 decimal digits. Separate signed zoned decimal data items can range from 2 to 32 bytes to encode 1 to 31 decimal digits and a one byte sign code. Due to the large and variable size of zoned decimal data, it is currently supported only as a storage operand. Before operating on the zoned decimal data, for example to perform computations, it is converted to another format, such as packed decimal or decimal floating point. The results of the computations are then converted back to a zoned decimal storage operand. These conversions to and from memory are time-consuming, impacting performance of the computing environment, and affecting availability of computer resources.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes executing an instruction to perform a conversion between one decimal format and another decimal format. The one decimal format or the other decimal format is a zoned decimal format. The executing includes obtaining a value from at least one register specified using the instruction, converting at least a portion of the value from the one decimal format to the other decimal format different from the one decimal format to provide a converted result, and writing a result obtained from the converted result into a single register specified using the instruction.

By using a single instruction to perform, at least, the converting and writing operations, performance is improved, and utilization of resources is reduced. By using a single architected instruction to perform, at least, the converting and writing operations, certain tasks may be performed, such as the converting and writing operations, much more efficiently than using a software paradigm. The converting and writing operations are performed much faster, reducing execution time, and improving processor and/or overall system performance.

The use of registers, such as hardware vector registers, in converting between a zoned decimal format and another format, operations on or using the data, e.g., by SIMD (single instruction, multiple data) instructions, are performed directly using the registers. For instance, the input and output are provided in the registers. This is more efficient than using memory to obtain the input and/or store the output. The operations are performed faster, reducing execution time, and improving processor and/or overall system performance. Further, by using registers for zoned decimal format, some operations, such as numeric editing and/or string processing of zoned decimal data items through the use of, e.g., a COBOL INSPECT statement, can be performed more efficiently by operating on the data in registers directly in the zoned decimal format.

Further, the writing to a single register is beneficial for data dependency and out-of-order execution. Conflict per instruction execution is reduced by writing to one register instead of multiple registers.

In one example, the one decimal format is the zoned decimal format, and the other decimal format is a packed decimal format.

In one example, the obtaining the value includes obtaining a first value from a first vector register specified using at least one field of the instruction, obtaining a second value from a second vector register specified using at least one field of the instruction, and concatenating the first value and the second value to obtain the value.

In one example, the writing includes determining a number of digits of the converted result to be written as the result, selecting the determined number of digits of the converted result to be written as the result, and writing the selected determined number of digits into the single register. This provides flexibility.

In one example, the determining the number of digits includes checking a control specified using the instruction. Further, as one example, the single register is a single vector register. The control allows flexibility and ease in using the instruction.

As another example, the one decimal format is a packed decimal format, and the other decimal format is the zoned decimal format. In one example, the converting the at least a portion of the value includes converting selected digits of the value to obtain the converted result. The selected digits include, for instance, a leftmost fifteen digits of the value. As a further example, the selected digits include a rightmost sixteen digits of the value, and the converting includes converting a sign of the value.

In one example, the writing includes writing the converted result to a selected portion of the single register, the single register being a vector register.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIGS. 7A-7B depict one example of facilitating processing within a computing environment, in accordance with one or more aspects of the present invention;

DETAILED DESCRIPTION

Figure 1A:
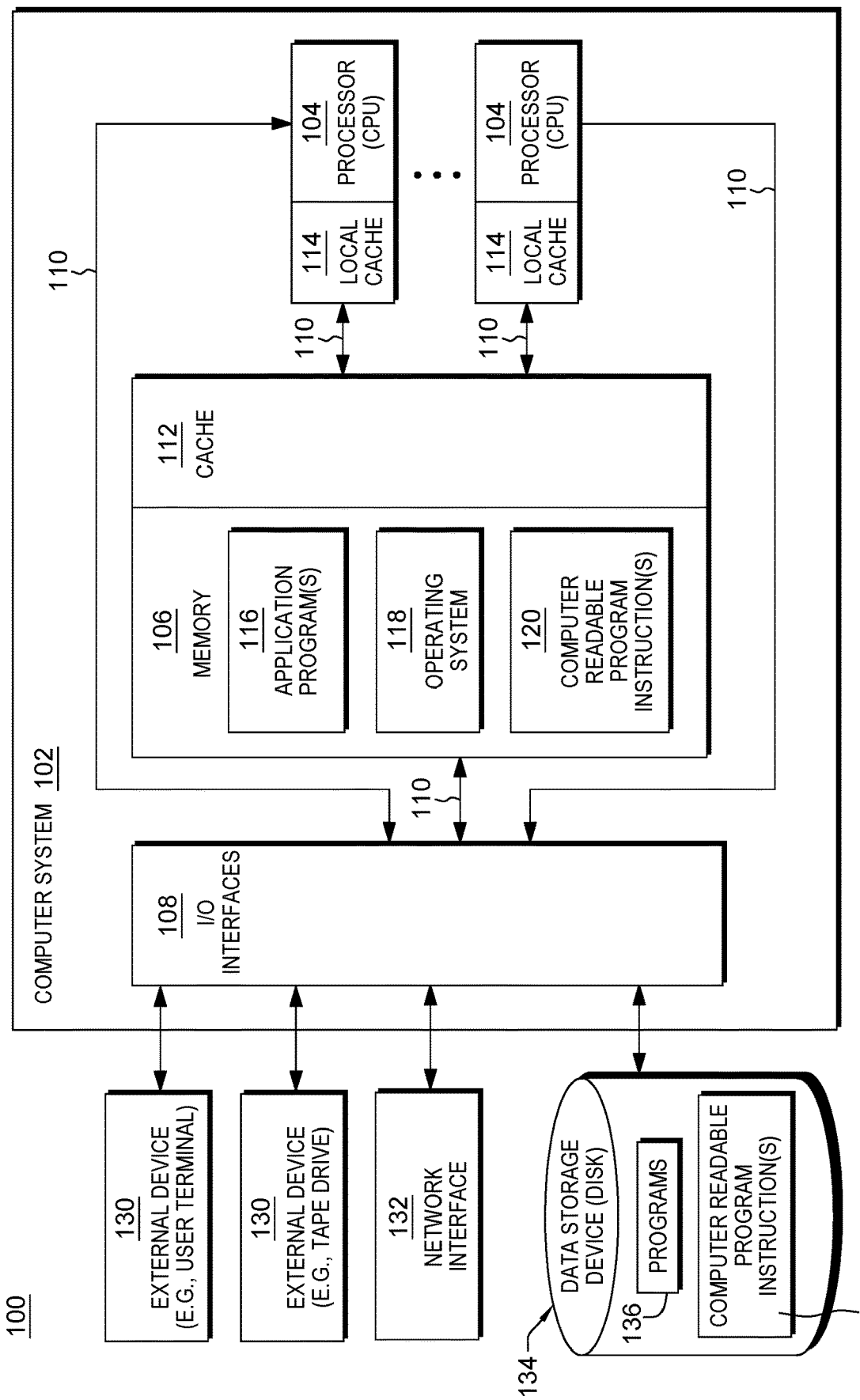
FIG. 1A depicts one example of a computing environment to incorporate and use one or more aspects of the present invention.

In accordance with one or more aspects of the present invention, a capability is provided to facilitate processing within a computing environment. As one example, a single instruction (e.g., a single architected hardware machine instruction at the hardware/software interface) is provided to perform a pack or unpack operation. For instance, a Vector Pack Zoned Register instruction is provided to perform a pack operation, and a Vector Unpack Zoned High instruction and a Vector Unpack Zoned Low instruction are provided to perform unpack operations. Each instruction is part of a general-purpose processor instruction set architecture (ISA), which is dispatched by a program on a processor, such as a general-purpose processor. (In another example, each instruction may be part of a special-purpose processor, such as a co-processor configured for certain functions.)

As part of execution of the Vector Pack Zoned Register instruction, a pack operation is performed in which a zoned decimal number is represented in a packed decimal format. To perform the pack operation, various operations are employed, such as, for instance, concatenating, converting, writing to a register, validity checking and/or condition code setting. Each of these operations is performed as part of executing the single instruction, improving system performance, and reducing use of system resources. Further, in one example, hardware registers (e.g., vector registers) specified using the instruction for both the source and target data are used in the pack operation, allowing operations on and/or use of the data directly within the registers by the instruction. This saves time, improves system performance, and reduces use of system resources.

In a further aspect, as part of execution of the Vector Unpack Zoned High instruction or the Vector Unpack Zoned Low instruction, an unpack operation is performed in which a packed decimal number is represented as one or more zoned decimal numbers. To perform the unpack operation, various operations are employed, such as, for instance, converting, writing to a register and/or validity checking. Each of these operations is performed as part of executing the single instruction, improving system performance, and reducing use of system resources. Further, in one example, hardware registers (e.g., vector registers) specified using the instruction for both the source and target data are used in the unpack operation, allowing operations and/or use of the data directly within the registers by the instruction. This saves time, improves system performance, and reduces use of system resources.

In one aspect, each instruction employs a single output vector register to hold the packed or unpacked data, which is beneficial for data dependency and out-of-order execution. Conflict per instruction execution is reduced by writing to one register instead of multiple registers.

One embodiment of a computing environment to incorporate and use one or more aspects of the present invention is described with reference to FIG. 1A. As an example, the computing environment is based on the z/Architecture® hardware architecture, offered by International Business Machines Corporation, Armonk, N.Y. One embodiment of the z/Architecture hardware architecture is described in a publication entitled, "z/Architecture Principles of Operation," IBM Publication No. SA22-7832-12, Thirteenth Edition, September 2019, which is hereby incorporated herein by reference in its entirety. The z/Architecture hardware architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 1A, a computing environment 100 includes, for instance, a computer system 102 shown, e.g., in the form of a general-purpose computing device. Computer system 102 may include, but is not limited to, one or more processors or processing units 104 (e.g., central processing units (CPUs)), a memory 106 (a.k.a., system memory, main memory, main storage, central storage or storage, as examples), and one or more input/output (I/O) interfaces 108, coupled to one another via one or more buses and/or other connections 110.

Bus 110 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 106 may include, for instance, a cache 112, such as a shared cache, which may be coupled to local caches 114 of processors 104. Further, memory 106 may include one or more programs or applications 116 and at least one operating system 118. An example operating system includes a z/OS® operating system, offered by International Business Machines Corporation, Armonk, N.Y. z/OS is a trademark or registered trademark of International Business Machines Corporation in at least one jurisdiction. Other operating systems offered by International Business Machines Corporation and/or other entities may also be used. Memory 106 may also include one or more computer readable program instructions 120, which may be configured to carry out functions of embodiments of aspects of the invention.

Computer system 102 may communicate via, e.g., I/O interfaces 108 with one or more external devices 130, such as a user terminal, a tape drive, a pointing device, a display, and one or more data storage devices 134, etc. A data storage device 134 may store one or more programs 136, one or more computer readable program instructions 138, and/or data, etc. The computer readable program instructions may be configured to carry out functions of embodiments of aspects of the invention.

Computer system 102 may also communicate via, e.g., I/O interfaces 108 with network interface 132, which enables computer system 102 to communicate with one or more networks, such as a local area network (LAN), a general wide area network (WAN), and/or a public network (e.g., the Internet), providing communication with other computing devices or systems.

Computer system 102 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with computer system 102. Examples, include, but are not limited to: microcode, device drivers, redundant processing units, external disk drive arrays, RAID systems, tape drives, and data archival storage systems, etc.

Computer system 102 may be operational with numerous other general-purpose or special purpose computing system environments or configurations. Examples of well-known computing systems, environments, and/or configurations that may be suitable for use with computer system 102 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
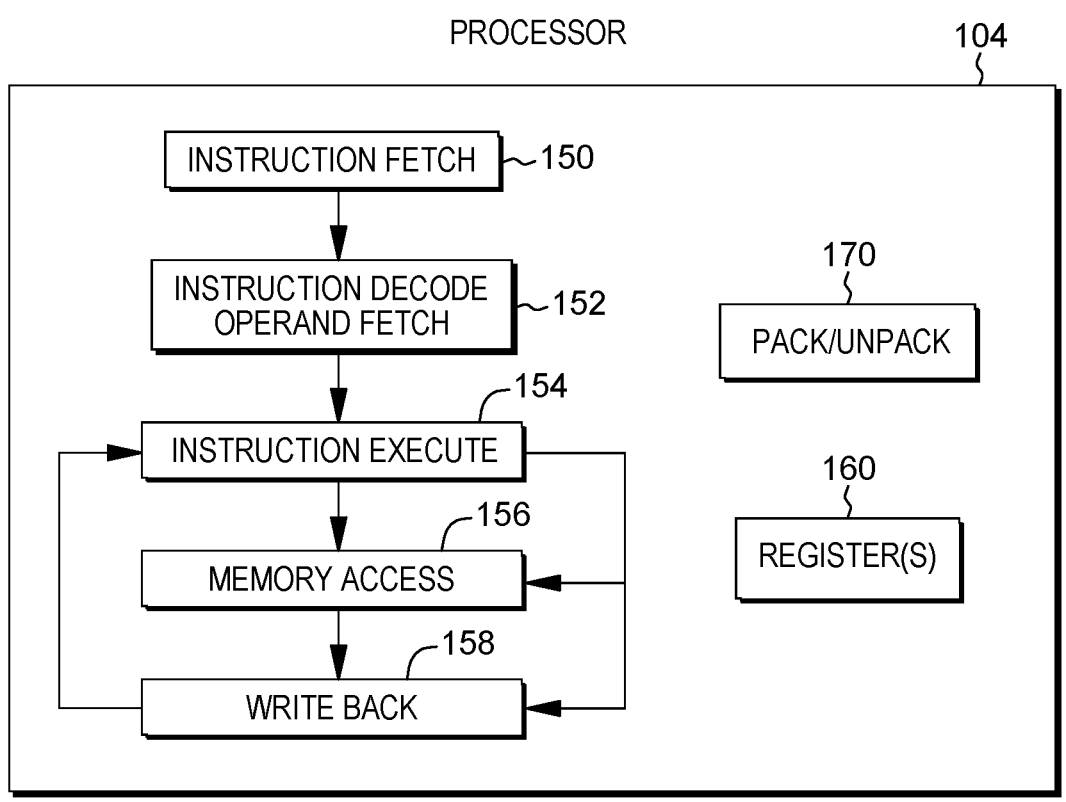
FIG. 1B depicts further details of a processor of FIG. 1A, in accordance with one or more aspects of the present invention.

In one example, a processor (e.g., processor 104) includes a plurality of functional components used to execute instructions. As depicted in FIG. 1B, these functional components include, for instance, an instruction fetch component 150 to fetch instructions to be executed; an instruction decode unit 152 to decode the fetched instructions and to obtain operands of the decoded instructions; one or more instruction execute components 154 to execute the decoded instructions; a memory access component 156 to access memory for instruction execution, if necessary; and a write back component 158 to provide the results of the executed instructions. One or more of the components may access and/or use one or more registers 160 in instruction processing. Further, one or more of the components may, in accordance with one or more aspects of the present invention, include at least a portion of or have access to one or more other components used in performing pack and unpack operations of, e.g., a Vector Pack Zoned Register Instruction, a Vector Unpack Zoned High instruction and/or a Vector Unpack Zoned Low instruction (or other processing that may use one or more aspects of the present invention), as described herein. The one or more other components include, for instance, a pack/unpack component (or one or more other components) 170.

The pack and unpack operations described herein include conversion between one decimal format, such as a zoned decimal format, and another decimal format, such as a signed packed decimal format. Examples of these formats are described with reference to FIGS. 2A-2B.

Figure 2A:
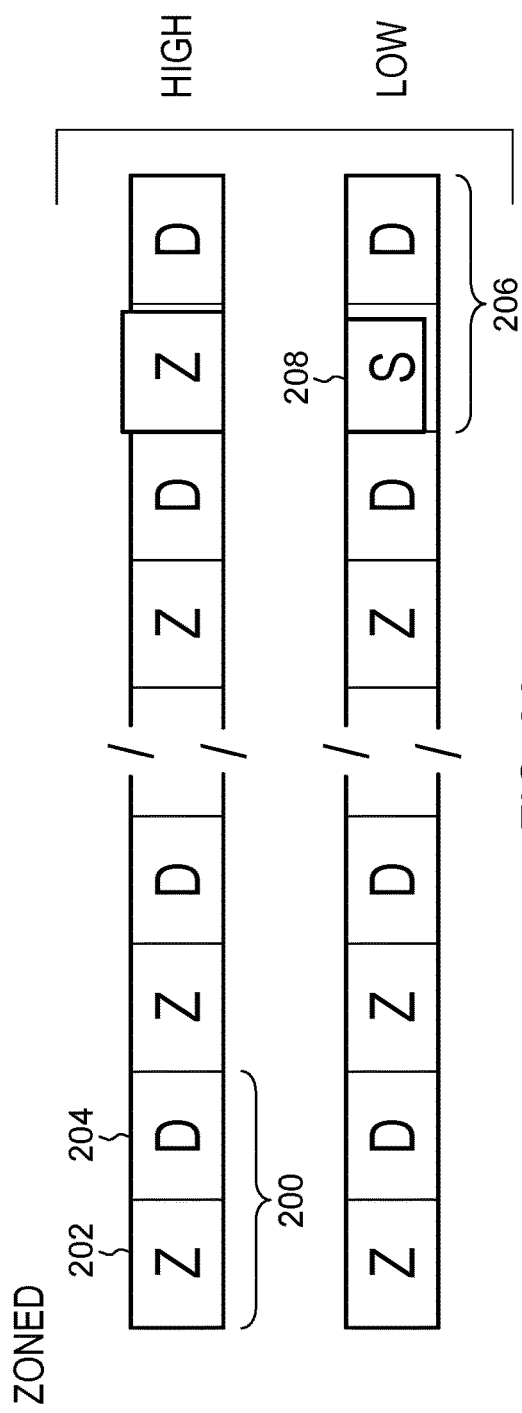
FIG. 2A depicts one example of a zoned decimal format, in accordance with one or more aspects of the present invention.

Referring to FIG. 2A, one example of a zoned decimal format is depicted. In one example, a zoned decimal number includes 32 digits (e.g., 256 bits), and each digit is stored in a byte. For instance, a byte 200 of a zoned decimal number includes a zone portion (e.g., leftmost 4 bits) 202 and a digit portion (e.g., rightmost 4 bits) 204. Digit portion 204 includes a code representing a decimal digit. Decimal digits in the zoned format may be part of a larger character set, which includes alphabetic and special characters. The zone portion of the low order byte 206 (e.g., rightmost byte of a decimal operand) may include a sign 208 of the decimal number.

Figure 2B:
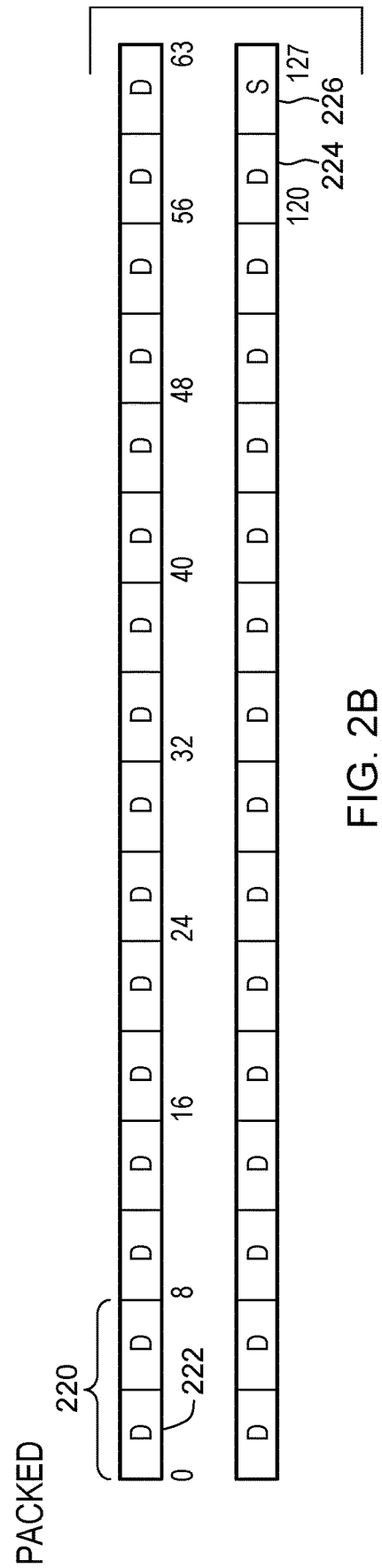
FIG. 2B depicts one example of a signed packed decimal format, in accordance with one or more aspects of the present invention.

Further, referring to FIG. 2B, one example of a signed packed decimal format is depicted. In one example, a sign packed decimal number is 128 bits in length, and each byte of storage 220 (except for the low order byte—rightmost byte) may include two decimal numbers 222. The low-order byte contains, for instance, one digit in the leftmost portion 224 of the byte and a sign (positive or negative) in the rightmost portion 226 of the byte.

In accordance with one or more aspects of the present invention, pack and unpack operations for zoned decimal and packed decimal values are performed using various instructions. For example, an instruction, referred to herein as a Vector Pack Zoned Register instruction, is provided to perform a pack operation. As part of executing the instruction, multiple operations are employed to perform the pack operation, including, for instance, concatenating, converting, writing to a register, validity checking and/or condition setting operations.

One embodiment of a Vector Pack Zoned Register instruction used to perform a pack operation, including, for instance, concatenating, converting, writing to a register, validity checking and/or condition code setting operations, is described with reference to FIGS. 3A-3C. The instruction is executed, in one example, using a general-purpose processor (e.g., processor 104). In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, may be specified, this is only an example. The bit may be set to a different value, such as the opposite value or to another value, in other examples. Many variations are possible.

In one example, the Vector Pack Zoned Register instruction has a VRI-f format that denotes a vector register and immediate operation with an extended operation code (opcode). The Vector Pack Zoned Register instruction is, for instance, part of a vector facility, which provides, for instance, fixed sized vectors ranging from one to sixteen elements. Each vector includes data which is operated on by vector instructions defined in the facility. In one embodiment, if a vector is made up of multiple elements, then each element is processed in parallel with the other elements. Instruction completion does not occur, in one example, until processing of all the elements is complete. In other embodiments, the elements are processed partially in parallel and/or sequentially.

In one embodiment, there are 32 vector registers and other types of registers can map to a quadrant of the vector registers. For instance, a register file, which is an array of processor registers in a central processing unit (e.g., processor 104), may include 32 vector registers and each register is 128 bits in length. Sixteen floating point registers, which are 64 bits in length, can overlay the vector registers. Thus, as an example, when floating point register 2 is modified, then vector register 2 is also modified. Other mappings for other types of registers are also possible.

Vector data appears in storage, for instance, in the same left-to-right sequence as other data formats. Bits of a data format that are numbered 0-7 constitute the byte in the leftmost (lowest-numbered) byte location in storage, bits 8-15 form the byte in the next sequential location, and so on.

In a further example, the vector data may appear in storage in another sequence, such as right-to-left.

Figure 3A:
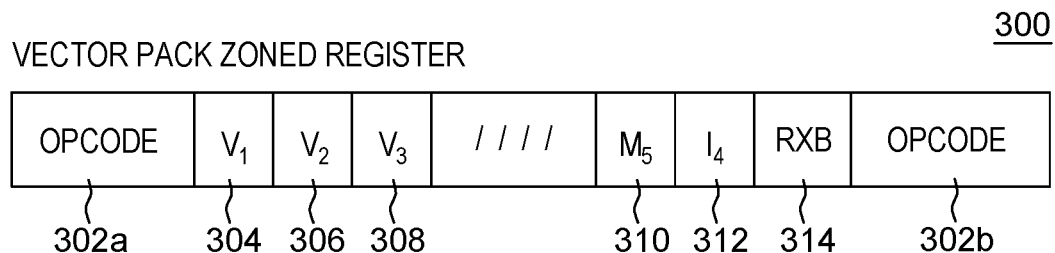
FIG. 3A depicts one example of a format of a Vector Pack Zoned Register instruction, in accordance with one or more aspects of the present invention.
Figure 3B:
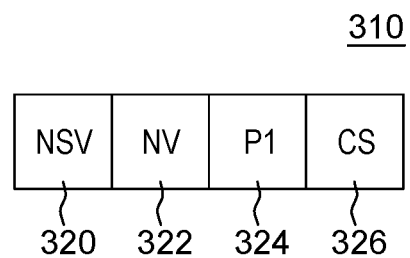
FIG. 3B depicts one example of further details of a mask field of the Vector Pack Zoned Register instruction, in accordance with one or more aspects of the present invention.
Figure 3C:
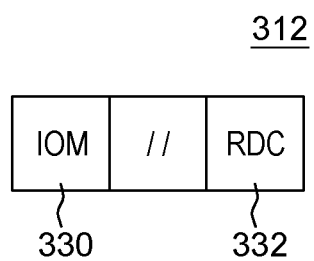
FIG. 3C depicts one example of further details of an immediate field of the Vector Pack Zoned Register instruction, in accordance with one or more aspects of the present invention.

As shown in FIG. 3A, in one example, a Vector Pack Zoned Register instruction 300 has a plurality of fields, and a field may have a subscript number associated therewith. The subscript number associated with a field of the instruction denotes the operand to which the field applies. For instance, the subscript number 1 associated with vector register $V_1$ denotes that the register specified using $V_1$ includes the first operand, and so forth. A register operand is one register in length, which is, for instance, 128 bits.

In one embodiment, Vector Pack Zoned Register instruction 300 includes operation code (opcode) fields 302$a$, 302$b$ (e.g., bits 0-7 and 40-47) indicating a pack operation in which the input data is, e.g., a zoned decimal number, and the output is, e.g., a signed packed decimal number; a first vector register ($V_1$) field 304 (e.g., bits 8-11) used to designate a first vector register; a second vector register ($V_2$) field 306 (e.g., bits 12-15) used to designate a second vector register; a third vector register ($V_3$) field 308 (e.g., bits 16-19) used to designate a third vector register; a mask ($M_5$) field 310 (e.g., bits 24-27); an immediate ($I_4$) field 312 (e.g., bits 28-35); and a register extension bit (RXB) field 314 (e.g., bits 36-39), each of which is described below. In one embodiment, the fields are separate and independent from one another; however, in other embodiments, more than one field may be combined. Further information regarding these fields is described below.

In one embodiment, vector register ($V_1$) field 304 is used to indicate a vector register that is to store the first operand. The first operand is a result obtained from the pack operation, including, e.g., concatenating the second operand located in a vector register specified using $V_2$ field 306 and the third operand located in a vector register specified using $V_3$ field 308 to form, e.g., a 32-byte zoned decimal number with 32 digits and a sign, which is converted to, e.g., a signed packed decimal format which has, e.g., 31 digits and a sign.

In one example, each of vector register fields 304, 306, 308 is used with RXB field 314 to designate the vector register. For instance, RXB field 314 includes the most significant bit for a vector register designated operand. Bits for register designations not specified by the instruction are to be reserved and set to zero. The most significant bit is concatenated, for instance, to the left of the four-bit register designation of the vector register field to create a five-bit vector register designation.

In one example, the RXB field includes four bits (e.g., bits 0-3), and the bits are defined, as follows:
- 0—Most significant bit for the first vector register designation (e.g., in bits 8-11) of the instruction.
- 1—Most significant bit for the second vector register designation (e.g., in bits 12-15) of the instruction, if any.
- 2—Most significant bit for the third vector register designation (e.g., in bits 16-19) of the instruction, if any.
- 3—Most significant bit for the fourth vector register designation (e.g., in bits 32-35) of the instruction, if any.

Each bit is set to zero or one by, for instance, the assembler depending on the register number. For instance, for registers 0-15, the bit is set to 0; for registers 16-31, the bit is set to 1, etc.

In one embodiment, each RXB bit is an extension bit for a particular location in an instruction that includes one or more vector registers. For instance, bit 0 of RXB is an extension bit for location 8-11, which is assigned to, e.g., $V_1$, and so forth. In particular, for vector registers, the register containing the operand is specified using, for instance, a four-bit field of the register field with the addition of its corresponding register extension bit (RXB) as the most significant bit. For instance, if the four bit field is 0110 and the extension bit is 0, then the five bit field 00110 indicates register number 6. In a further embodiment, the RXB field includes additional bits, and more than one bit is used as an extension for each vector or location.

In one example, the mask field of the instruction (e.g., $M_5$ 310) is used in controlling one or more aspects of execution of the instruction, as described herein. In one example, referring to FIG. 3B, $M_5$ field 310 includes, for instance:

No Sign Validation (NSV) 320: When this control (e.g., bit 0) is zero and the No Validation (NV) control (e.g., bit 1) (described below) is zero, the sign code of the source vector (e.g., a concatenation of the second operand and the third operand) is checked for validity to determine if there is a general operand data exception. When this control (e.g., bit 0) is one, or the No Validation control is one, the source vector sign code is only checked for validity for setting the condition code.

No Validation (NV) 322: When this control (e.g., bit 1) is zero, the source vector digits are checked for validity for general operand data exceptions; if the No Sign Validation control is zero, then the source vector sign code is also checked for validity. When this control (e.g., bit 1) is one, then the source vector digits and sign code validities are only used for condition code setting and general operand data exception is not reported.

Force Operand 1 Positive (P1) 324: When this control (e.g., bit 2) is one, the sign of the result placed in the first operand is forced to positive and a sign code of, e.g., 1111 is used. When this control (e.g., bit 2) is zero, the sign of the result placed in the first operand maintains the sign code from the source vector.

Condition Code Set (CS) 326: When this control (e.g., bit 3) is zero, the condition code is not set and remains unchanged. When this control (e.g., bit 3) is one, the condition code is set as specified below:

When the Condition Code Set control is one, the condition code is set, as follows:

0 The result is equal to zero and all digits and sign are valid, and no overflow.

1 The result is not equal to zero and the sign is negative, and all digits and sign are valid, and no overflow.

2 The result is not equal to zero and the sign is positive, and all digits and sign are valid, and no overflow.

3 Overflow or invalid digits or invalid sign.

The following summarizes example combinations of No Validation, No Sign Validation, and Condition Code Set fields and whether the sign of digits are checked for a general data exception, which is independent of the value of Forced Operand 1 Positive, and whether the condition code is set based on validity:

| NV | NSV | CS | Sign Check for Gen. Data Exception | Digit Check for Gen. Data Exception | Condition Code Set |
|----|-----|-----|-----|-----|-----|
| 0 | 0 | 0 | Yes | Yes | No |
| 0 | 0 | 1 | Yes | Yes | Yes |
| 0 | 1 | 0 | No | Yes | No |
| 0 | 1 | 1 | No | Yes | Yes |
| 1 | 0 | 0 | No | No | No |
| 1 | 0 | 1 | No | No | Yes |
| 1 | 1 | 0 | No | No | No |
| 1 | 1 | 1 | No | No | Yes |

In one example, if No Validation or No Sign Validation are equal to one, the sign code is not checked for validity and an invalid sign code of the source operand is propagated to the result if Force Operand 1 Positive is zero.

The instruction also uses, in one example, an immediate field (e.g., $I_4$ 312). As an example, referring to FIG. 3C, immediate field 312 includes, for instance:

Instruction Overflow Mask (IOM) 330: This control (e.g., bit 0) is the instruction overflow mask. When the Instruction Overflow Mask is one, or when the Decimal Overflow Mask (e.g., in a control register, such as a program status word) is zero, decimal overflow exception is suppressed.

Result Digits Count (RDC) 332: Bits 3-7 contain an unsigned binary number specifying the number of rightmost digits of the source vector to be placed in the first operand. If the magnitude of the source vector is larger than the largest decimal number that can be represented with the specified number of digits, decimal overflow occurs, and if the Decimal Overflow Mask is one and the Instruction Overflow Mask is zero, a program interruption for decimal overflow occurs. If the Result Digits Count field is zero, a specification exception is reported.

In one example, bits 1-2 are reserved and are to include zeros; otherwise, a specification exception is recognized.

In execution of one embodiment of the Vector Pack Zoned Register instruction, a source vector (also referred to as a concatenated value) is formed from the concatenation of the second operand located in a vector register specified using $V_2$ field 306 followed by the third operand located in a vector register specified using $V_3$ field 308 to form, e.g., a 32-byte zoned decimal number with 32 digits and a sign. The source vector is converted to a converted result, such as, e.g., a signed packed decimal format, having, e.g., 31 digits and a sign. A result obtained from the converted result is placed in the first operand location (e.g., a vector register specified using $V_1$ field 304).

In one example, all digit codes of the source vector are checked for validity to determine if there is a general operand data exception unless, e.g., the No Validation control is one. The sign code of the source vector is checked for validity to determine if there is a general operand data exception unless, e.g., the No Sign Validation control is one or the No Validation control is one. In one example, the zone digits are not checked for validity and the source vector only has, e.g., one sign digit located in the zone field of the rightmost byte.

The Condition Code Set control is independent of the control of the general operand data exception, and when equal to, e.g., one, all digits and the sign code of the source vector are checked for validity to determine the condition code setting.

The determination of general operand data exception is prior to decimal overflow detection and has precedence over it, in one example.

If the Result Digits Count control specifies less than thirty one digits, zeros are placed in the remaining leftmost digits of the first operand. Decimal overflow occurs if either the leftmost digit of the source vector is non-zero, or if the Result Digits Count field specifies fewer digits than the number of digits in the source vector when leading zero digits are excluded. Decimal overflow is suppressed when either the Decimal Overflow Mask is, e.g., a zero or the Instruction Overflow Mask field in the fourth operand is, e.g., a one.

Further details of one embodiment of processing based on execution of a Vector Pack Zoned Register instruction, in accordance with one or more aspects of the present invention, are described with reference to FIG. 4. In one example, a processor, such as a general processor 104, is used to execute the instruction. As an example, hardware of the processor is used to execute the instruction. The hardware may be within the processor or coupled thereto for purposes of receiving the instruction from the processor, which, e.g., obtains, decodes and sets-up the instruction to execute on the hardware. Other variations are possible.

Figure 4:
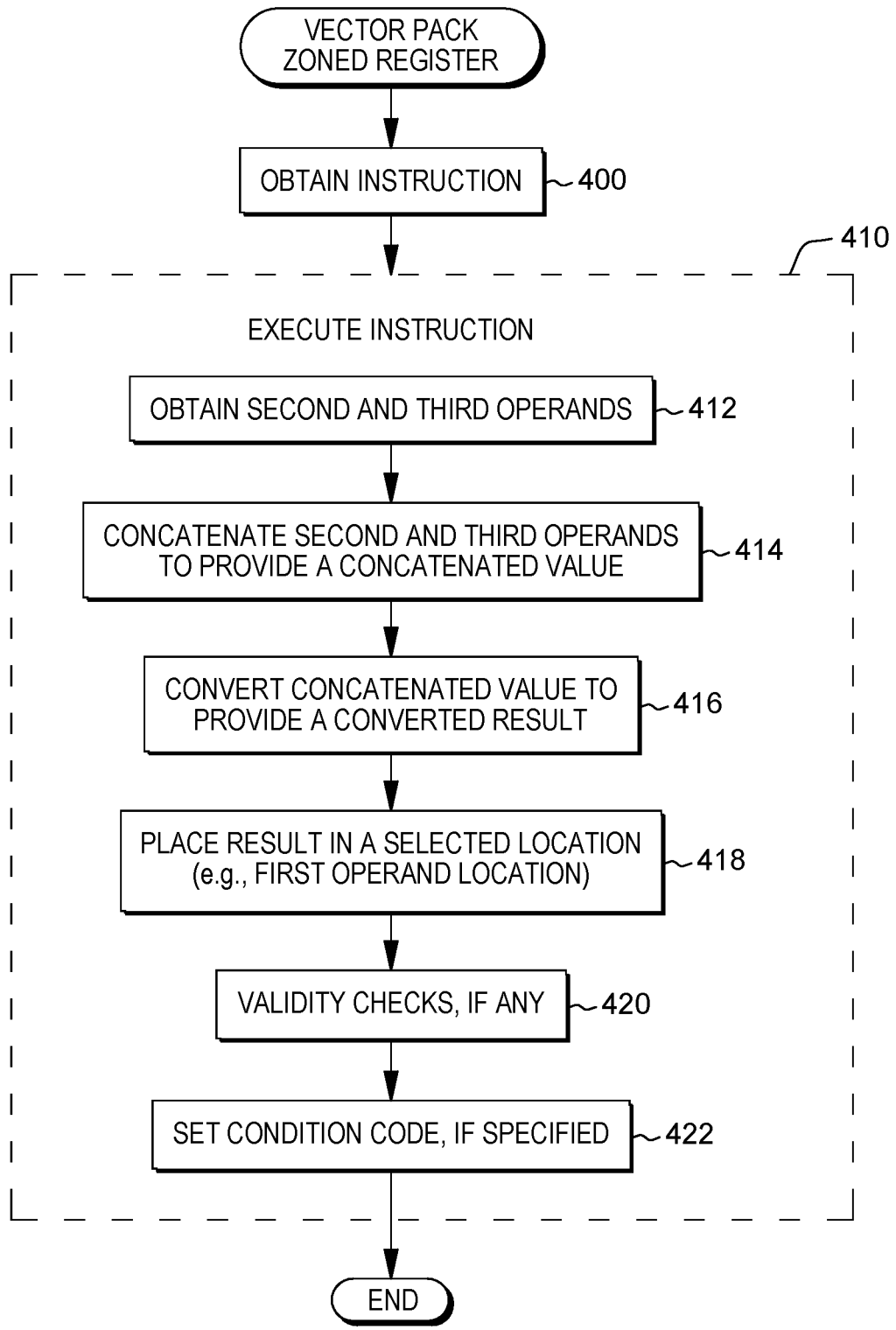
FIG. 4 depicts one example of processing associated with execution of a Vector Pack Zoned Register instruction, in accordance with one or more aspects of the present invention.

Referring to FIG. 4, in one embodiment, initially, an instruction, such as a Vector Pack Zoned Register instruction, is obtained (e.g., fetched, received, provided, etc.) 400 and executed 410. The executing includes, for instance, obtaining the second and third operands of the instruction 412, which are concatenated to provide a concatenated value (also referred to as a source vector) 414. The second operand is, for instance, a zoned decimal number (e.g., 16 digits, and optionally a sign, which is not used in the concatenation) obtained from a location (e.g., a vector register) specified by the instruction (e.g., using $V_2$ field 306), and the third operand is, for instance, another zoned decimal number (e.g., 16 digits and a sign) obtained from a location (e.g., a vector register) specified by the instruction (e.g., using $V_3$ field 308). The concatenation is, for instance, the second operand followed by the third operand, which provides a source vector of, e.g., 32 digits and a sign, also referred to herein as a concatenated value.

The concatenated value, which is in one format, such as the zoned decimal format, is converted to another format, such as a signed packed decimal format, to provide a converted result 416. In one example, the signed packed decimal format includes 31 digits and a sign. To perform the conversion, as an example, digits of the zoned decimal number are placed in nibbles (two nibbles to a byte) of the packed decimal format. For instance, the rightmost digit of the concatenated value is placed in the rightmost byte of the signed packed decimal format (in the left nibble since the sign of the concatenated value is placed in the right nibble). The next two rightmost digits of the concatenated value are placed in the next rightmost byte of the signed packed decimal, and so forth. The leftmost digit of the concatenated zoned decimal number is not placed in the signed packed decimal format, since the signed packed decimal format includes 31 digits and a sign. Decimal overflow occurs if the leftmost digit of the source vector (e.g., $32^{nd}$ digit) is non-zero. Further, as described herein, decimal overflow occurs if the RDC field specifies fewer digits than the number of digits in the source vector when leading zero digits are excluded. As examples: if 32-byte/digit input source vector with 29 leading zero digits: F0 . . . F0 F1 F2 F3 and RDC=2 (or less), overflow occurs; if 32-byte/digit input source vector with 30 leading zero digits: F0 . . . F0 F0 F2 F3 and RDC=2 (or greater), no overflow; if 32-byte/digit input source vector with a non-zero leftmost zero digit, overflow occurs regardless of RDC value. Decimal overflow is suppressed when either the Decimal Overflow Mask is a zero or the Instruction Overflow Mask field in the fourth operand is a one, as examples.

A result obtained from the converted result is placed in a selected location, such as a first operand location (e.g., a register specified using $V_1$ of the instruction) 418. In one example, the placing is based on one or more controls specified by the instruction. For instance, the Result Digits Count specifies the number of rightmost digits of the source vector (or the converted result, since the rightmost digits of the source vector are the same as the rightmost digits of the converted result, e.g., if RDC=5, then the 5 rightmost digits of the converted result are the same 5 rightmost digits of the source vector) to be placed in the first operand (starting, e.g., at the left nibble of the rightmost byte). If the magnitude of the source vector is larger than the largest decimal number that can be represented with the specified number of digits, decimal overflow occurs, and if the Decimal Overflow Mask is one and the Instruction Overflow Mask is zero, a program interruption for decimal overflow occurs. If the Result Digits Count field is zero, a specification exception is reported. Further, if the Result Digits Count control specifies less than thirty one digits, zeros are placed in the remaining leftmost digits of the first operand. Decimal overflow occurs if either the leftmost digit of the source vector is non-zero, or if the Result Digits Count field specifies fewer digits than the number of digits in the source vector when leading zeros are excluded. Decimal overflow is suppressed when either the Decimal Overflow Mask is, e.g., a zero or the Instruction Overflow Mask field in the fourth operand is, e.g., a one.

The placing of the result in the first operand includes providing a sign, which is selected based on a control of the instruction (e.g., Force Operand 1 Positive control 324). When control 324 is one, the sign of the result placed in the first operand (e.g., in the rightmost nibble) is forced to positive and a sign code of 1111 is used. When control 324 is zero, the sign of the result placed in the first operand maintains the sign code from the source vector.

Optionally, one or more validity checks may be performed, as specified by one or more controls of the instruction 420. For instance, the validity checks, if any, are determined based on, e.g., No Validation control 322 and/or the No Sign Validation control 320 of the $M_5$ field of the instruction. As an example, the digit codes of the source vector are checked for validity (e.g., check that the digit is in the inclusive range of 0 to 9) to determine if there is a general operand data exception unless, e.g., the No Validation control is one. The sign code of the source vector is checked for validity (e.g., check that the sign code is in the inclusive hexadecimal range of 0xA to 0xF) to determine if there is a general operand data exception unless, e.g., the No Sign Validation control is one or the No Validation control is one. In one example, the zone digits are not checked for validity and the source vector only has, e.g., one sign digit located in the zone field of the rightmost byte.

Further, in one example, optionally, a condition code is set depending on one or more controls specified by the instruction, such as the Condition Code Set control 326 (422). In one example, the Condition Code Set control is independent of the control of general operand data exception, and when equal to, e.g., one, all digits and the sign code of the source vector are checked for validity to determine the condition code setting.

Although various fields and registers of the Vector Pack Zoned Register instruction are described, one or more aspects of the present invention may use other, additional and/or fewer fields and/or registers, and/or other sizes of fields and/or registers, etc. Many variations are possible. For instance, implied registers may be used instead of explicitly specified registers and/or fields of the instruction and/or explicitly specified registers and/or fields may be used instead of implied registers and/or fields. Other variations are also possible.

As described herein, in one aspect, a single instruction (e.g., a single architected machine instruction at the hardware/software interface, e.g., a Vector Pack Zoned Register instruction) is provided to perform a pack operation. This instruction is, for instance, a hardware instruction defined in an instruction set architecture (ISA) that directly performs a pack operation, including, for instance, concatenation, conversion, writing to a register, validity checking and/or condition code setting. Processing is faster and more efficient than a program that performs a pack operation and the operations that are employed. The complexity of a program related to a pack operation is reduced. Further, performance of the operations, and thus, the processor, is improved. The hardware instruction execution reduces execution times and improves performance.

By using a single instruction to perform, e.g., a pack operation, rather than multiple instructions (e.g., to perform the various operations of a pack operation, and/or to be used to perform multiple pack operations for larger data sizes), performance is improved by not requiring multiple passes through the hardware/software interface. Further, by performing the processing as part of one instruction, the processing remains in the processing unit performing the operations, not requiring prior to completing the processing, updating of the registers of a register file of the processor (i.e., an array of processor registers used to store data between memory and the functional units). This improves execution time and reduces use of processor resources.

Further, by using a single instruction that is register to register (input is provided by registers and output is written to a single register), performance is improved by, e.g., not having to read the input from memory nor write the output to memory. Register to register instructions also facilitate more efficient operations with other instructions that also operate on registers as memory does not have to be referenced to obtain the input/output values.

In another aspect, vector unpack zoned instructions are provided, in which each instruction uses only one vector register write. As examples, the vector unpack zoned instructions include a Vector Unpack Zoned High instruction and a Vector Unpack Zoned Low instruction, each of which is used, in accordance with an aspect of the present invention, to unpack a value in one format (e.g., a signed packed decimal format) to provide a value in another format (e.g., a zoned decimal format). Each instruction performs an unpack operation, in which a signed packed decimal number is represented as one or more zoned decimal numbers. To perform the unpack operation, various operations are employed, such as, for instance, converting, writing to a register and/or validity checking. Each of these operations is performed as part of executing the single instruction, improving system performance, and reducing use of system resources. Further details regarding each instruction are described below.

One embodiment of a Vector Unpack Zoned High instruction used to perform an unpack operation is described with reference to FIGS. 5A-5B. The instruction is executed, in one example, using a general-purpose processor (e.g., processor 104). In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, may be specified, this is only an example. The bit may be set to a different value, such as the opposite value or to another value, in other examples. Many variations are possible.

In one example, the Vector Unpack Zoned High instruction has a VRR-k format that denotes a vector register and register operation with an extended operation code (opcode). The instruction is, for instance, part of the vector facility, as described herein.

Figure 5A:
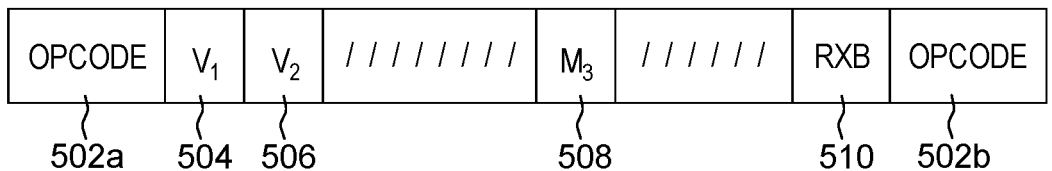
FIG. 5A depicts one example of a format of a Vector Unpack Zoned High instruction, in accordance with one or more aspects of the present invention.
Figure 5B:
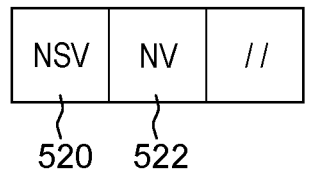
FIG. 5B depicts one example of further details of a mask field of the Vector Unpack Zoned High instruction, in accordance with one or more aspects of the present invention.

As shown in FIG. 5A, in one example, a Vector Unpack Zoned High instruction 500 has a plurality of fields, and a field may have a subscript number associated therewith. The subscript number associated with a field of the instruction denotes the operand to which the field applies. For instance, the subscript number 1 associated with vector register $V_1$ denotes that the register specified using $V_1$ includes the first operand, and so forth. A register operand is one register in length, which is, for instance, 128 bits.

In one embodiment, Vector Unpack Zoned High instruction 500 includes operation code (opcode) fields 502a, 502b (e.g., bits 0-7 and 40-47) indicating an unpack operation in which the input data is, e.g., a signed packed decimal number, and the output is, e.g., a zoned decimal number; a first vector register ($V_1$) field 504 (e.g., bits 8-11) used to designate a first vector register; a second vector register ($V_2$) field 506 (e.g., bits 12-15) used to designate a second vector register; a mask ($M_3$) field 508 (e.g., bits 24-27); and a register extension bit (RXB) field 510 (e.g., bits 36-39), each of which is described below. In one embodiment, the fields are separate and independent from one another; however, in other embodiments, more than one field may be combined. Further information regarding these fields is described below.

In one embodiment, vector register ($V_1$) field 504 is used to indicate a vector register that is to store the first operand (e.g., a result), and vector register ($V_2$) field 506 is used to indicate a vector register to store a second operand that is an input to the instruction. The second operand is in, e.g., a signed packed decimal format having, e.g., 31 digits and a sign. In one example, each of vector register fields 504, 506 is used with RXB field 510 to designate the vector register.

In one example, the mask field of the instruction (e.g., $M_3$ 508) is used to control one or more aspects of execution of the instruction, as described herein. In one example, referring to FIG. 5B, $M_3$ field 508 includes, for instance:

No Sign Validation (NSV) 520: If this control (e.g., bit 0) is zero and the No Validation (NV) control (described below) is zero, then the second operand sign code is checked for validity to determine if there is a general operand data exception. If this control (e.g., bit 0) is one, or the No Validation control is one, then the second operand sign code is not checked for validity.

No Validation (NV) 522: If this control (e.g., bit 1) is zero, then the second operand digits are checked for validity; if the No Sign Validation control is also zero, then the second operand sign code is checked for validity. If this control (e.g., bit 1) is one, then the second operand digits and sign code are not checked for validity.

In one example, bits 2-3 are reserved and are to include zeros; otherwise, a specification exception is recognized.

In execution of one embodiment of the Vector Unpack Zoned High instruction, selected digits (e.g., the leftmost 15 digits) of the second operand of one format, such as a signed packed decimal format having 31 digits and a sign, are converted to a converted result of another format, such as a zoned decimal format, and placed in a selected location, e.g., the rightmost 15 bytes of the first operand. The most significant digit is set equal to, e.g., zero.

In one example, zone bits with a coding of 1111 binary are supplied for all bytes and the sign digit is not expanded into the result. All 31 digits of the second operand, in one embodiment, are checked for valid codes if the No Validation control is zero and the sign is also checked if the No Sign Validation control is zero.

Further details of one embodiment of processing based on execution of a Vector Unpack Zoned High instruction, in accordance with one or more aspects of the present invention, are described with reference to FIG. 6. In one example, a processor, such as a general processor 104, is used to execute the instruction. As an example, hardware of the processor is used to execute the instruction. The hardware may be within the processor or coupled thereto for purposes of receiving the instruction from the processor, which, e.g., obtains, decodes and sets-up the instruction to execute on the hardware. Other variations are possible.

Figure 6:
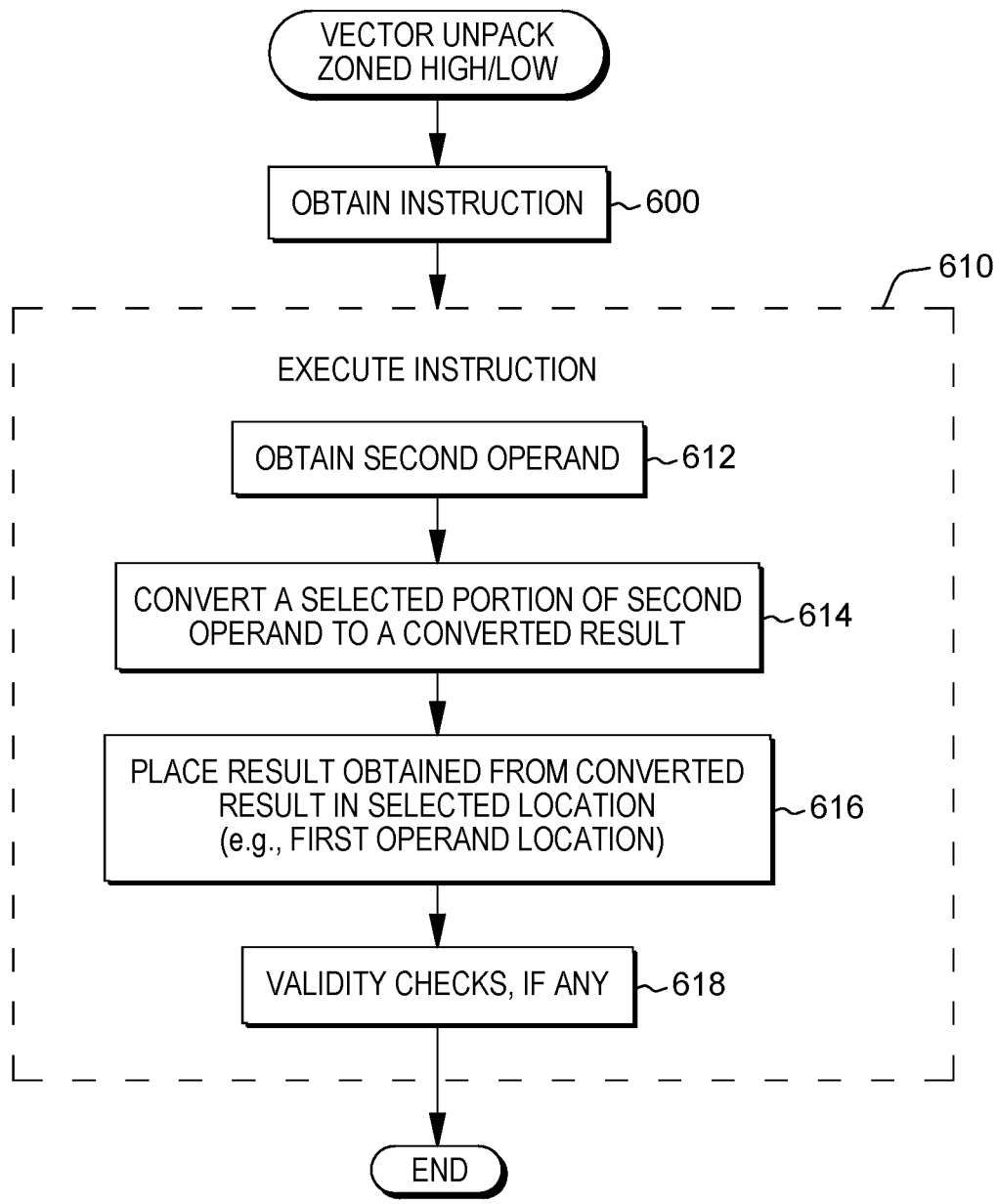
FIG. 6 depicts one example of processing associated with execution of a Vector Unpack Zoned High or a Vector Unpack Zoned Low instruction, in accordance with one or more aspects of the present invention.

Referring to FIG. 6, in one embodiment, initially, an instruction, such as a Vector Unpack Zoned High instruction, is obtained (e.g., fetched, received, provided, etc.) 600 and executed 610. The executing includes, for instance, obtaining the second operand of the instruction 612, which is in a signed packed decimal format having, e.g., 31 digits and a sign. A selected portion of the second operand (e.g., leftmost 15 digits) is converted to a converted result (e.g., in a zoned format) 614. To perform the conversion, as an example, the leftmost 15 digits are placed in 15 bytes of the zoned format. For instance, each digit is written to the rightmost nibble of each byte in the zoned format. A result obtained from the converted result is placed in a selected location (e.g., a first operand location, such as a register specified using the $V_1$ field of the instruction) 616. As an example, the converted result is placed in the rightmost 15 bytes of the first operand and the most significant digit (e.g., leftmost digit) is set equal to zero. Again, each digit is written to the rightmost nibble of each byte of the zoned format. Further, in one example, zone bits with a coding of 1111 binary are supplied for all bytes (e.g., leftmost nibble of each byte) and the sign digit is not expanded into the result.

In one example, the 31 digits of the second operand are checked for valid codes (e.g., in the inclusive range of 0 to 9) if, for instance, the No Validation control is zero and the sign is also checked (e.g., in the inclusive hexadecimal range of 0xA to 0xF) if the No Sign Validation control is zero 618.

Although various fields and registers of the Vector Unpack Zoned High instruction are described, one or more aspects of the present invention may use other, additional and/or fewer fields and/or registers, and/or other sizes of fields and/or registers, etc. Many variations are possible. For instance, implied registers may be used instead of explicitly specified registers and/or fields of the instruction and/or explicitly specified registers and/or or fields may be used instead of implied registers and/or fields. Other variations are also possible.

As described herein, in one aspect, a single instruction (e.g., a single architected machine instruction at the hardware/software interface, e.g., a Vector Unpack Zoned High instruction) is provided to unpack a signed packed decimal number. This instruction is, for instance, a hardware instruction defined in an instruction set architecture (ISA) that directly performs an unpack operation, including, for instance, converting, writing to a register and/or validity checking. Processing is faster and more efficient than a program that performs an unpack operation and the operations that are employed. The complexity of the program related to an unpack operation is reduced. Further, performance of the operations, and thus, the processor, is improved. The hardware instruction execution reduces execution times and improves performance.

By using a single instruction to perform, e.g., an unpack operation, rather than multiple instructions (e.g., to perform the various operations of an unpack operation, and/or to be used to perform multiple unpack operations for larger data sizes), performance is improved by not requiring multiple passes through the hardware/software interface. Further, by performing the processing as part of one instruction, the processing remains in the processing unit performing the operations, not requiring prior to completing the processing, updating of the registers of a register file of the processor (i.e., an array of processor registers used to store data between memory and the functional units). This improves execution time and reduces use of processor resources.

Further, by using a single instruction that is register to register, performance is improved.

One embodiment of a Vector Unpack Zoned Low instruction used to perform an unpack operation is described with reference to FIGS. 5C-5D. The instruction is executed, in one example, using a general-purpose processor (e.g., processor 104). In the description herein, specific locations, specific fields and/or specific sizes of the fields are indicated (e.g., specific bytes and/or bits). However, other locations, fields and/or sizes may be provided. Further, although the setting of a bit to a particular value, e.g., one or zero, may be specified, this is only an example. The bit may be set to a different value, such as the opposite value or to another value, in other examples. Many variations are possible.

In one example, the Vector Unpack Zoned Low instruction has a VRR-k format that denotes a vector register and register operation with an extended operation code (opcode). The instruction is, for instance, part of the vector facility, as described herein.

Figure 5C:
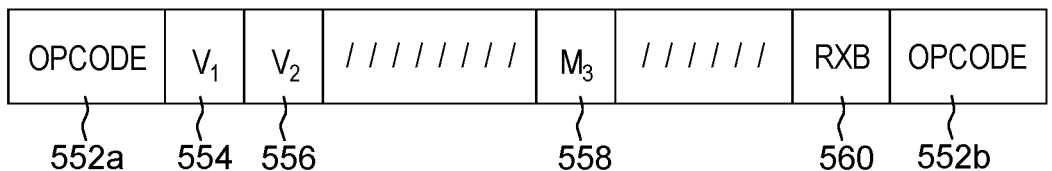
FIG. 5C depicts one example of a format of a Vector Unpack Zoned Low instruction, in accordance with one or more aspects of the present invention.
Figure 5D:
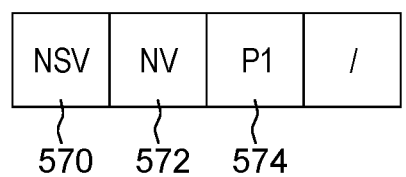
FIG. 5D depicts one example of further details of a mask field of the Vector Unpack Zoned Low instruction, in accordance with one or more aspects of the present invention.

As shown in FIG. 5C, in one example, a Vector Unpack Zoned Low instruction 550 has a plurality of fields, and a field may have a subscript number associated therewith. The subscript number associated with a field of the instruction denotes the operand to which the field applies. For instance, the subscript number 1 associated with vector register $V_1$ denotes that the register specified using $V_1$ includes the first operand, and so forth. A register operand is one register in length, which is, for instance, 128 bits.

In one embodiment, a Vector Unpack Zoned Low instruction 550 includes operation code (opcode) fields 552a, 552b (e.g., bits 0-7 and 40-47) indicating an unpack operation in which the input data is, e.g., a signed packed decimal number, and the output is, e.g., a zoned decimal number; a first vector register ($V_1$) field 554 (e.g., bits 8-11) used to designate a first vector register; a second vector register ($V_2$) field 556 (e.g., bits 12-15) used to designate a second vector register; a mask ($M_3$) field 558 (e.g., bits 24-27); and a register extension bit (RXB) field 560 (e.g., bits 36-39), each of which is described below. In one embodiment, the fields are separate and independent from one another; however, in other embodiments, more than one field may be combined. Further information regarding these fields is described below.

In one embodiment, vector register ($V_1$) field 554 is used to indicate a vector register that is to store the first operand (e.g., a result), and vector register ($V_2$) field 556 is used to indicate a vector register to store a second operand that is an input to the instruction. The second operand is in, e.g., a signed packed decimal format having, e.g., 31 digits and a sign. In one example, each of vector register fields 554, 556 is used with RXB field 560 to designate the vector register.

In one example, the mask field of the instruction (e.g., $M_3$ 558) is used to control one or more aspects of execution of the instruction, as described herein. In one example, referring to FIG. 5D, $M_3$ field 558 includes, for instance:

No Sign Validation (NSV) 570: If this control (e.g., bit 0) is zero and the No Validation (NV) control (described below) is zero, then the second operand sign code is checked for validity to determine if there is a general operand data exception. If this control (e.g., bit 0) is one, or the No Validation control is one, then the second operand sign code is not checked for validity.

No Validation (NV) 572: If this control (e.g., bit 1) is zero, then the second operand digits are checked for validity; if the No Sign Validation control is zero, then the second operand sign code is also checked for validity. If this control (e.g., bit 1) is one, then the second operand digits and sign code are not checked for validity.

Force Operand 1 Positive (P1) 574: When this control (e.g., bit 2) is one, the sign of the result placed in the first operand is forced to positive and a sign code of 1111 is used. When this control (e.g., bit 2) is zero, the sign of the result placed in the first operand maintains the sign code from the second operand. In one example, this field is applied if there is no general operand data exception.

In one example, bit 3 is reserved and is to include a zero; otherwise, a specification exception is recognized.

In one example, if No Validation or No Sign Validation is equal to one, the sign code is not checked for validity and an invalid sign code of the source operand is propagated to the result if the Force Operand 1 Positive control is zero.

In execution of one embodiment of the Vector Unpack Zoned Low instruction, selected digits (e.g., the rightmost 16 digits) of the second operand of one format, such as a signed packed decimal format having 31 digits and a sign, are converted to a converted result of another format, such as a zoned decimal format, and placed in, e.g., the first operand location.

In one example, zone bits with a coding of 1111 binary are supplied for all bytes except the rightmost byte, the zone of which receives the sign of the first operand. All 31 digits of the second operand are checked for valid codes if the No Validation control is zero and the sign is also checked if the No Sign Validation control is zero.

Further details of one embodiment of processing based on execution of a Vector Unpack Zoned Low instruction, in accordance with one or more aspects of the present invention, are described with reference to FIG. 6. In one example, a processor, such as a general processor 104, is used to execute the instruction. As an example, hardware of the processor is used to execute the instruction. The hardware may be within the processor or coupled thereto for purposes of receiving the instruction from the processor, which, e.g., obtains, decodes and sets-up the instruction to execute on the hardware. Other variations are possible.

Referring to FIG. 6, in one embodiment, initially, an instruction, such as a Vector Unpack Zoned Low instruction, is obtained (e.g., fetched, received, provided, etc.) 600 and executed 610. The executing includes, for instance, obtaining the second operand of the instruction 612, which is in a signed packed decimal format having, e.g., 31 digits and a sign. A selected portion of the second operand (e.g., rightmost 16 digits and sign) is converted to a converted result (e.g., in a zoned format) 614. To perform the conversion, as an example, the rightmost 16 digits and the sign are placed in 16 bytes of the zoned format. For instance, each digit is written to the rightmost nibble of each byte in the zoned format, and the sign is placed in the left nibble of the rightmost byte. A result obtained from the converted result is placed in a selected location (e.g., a first operand location, such as a register specified using the $V_1$ field of the instruction) 616. For instance, the converted result is written to the vector register specified using $V_1$, in which each digit is written to the rightmost nibble of each byte. Further, in one example, zone bits with a coding of 1111 binary are supplied for all bytes (e.g., leftmost nibble of each byte) except the rightmost byte, the zone of which receives the sign of the first operand.

In one example, the 31 digits of the second operand are checked for valid codes if, for instance, the No Validation control is zero and the sign is also checked if the No Sign Validation control is zero 618.

Although various fields and registers of the Vector Unpack Zoned Low instruction are described, one or more aspects of the present invention may use other, additional and/or fewer fields and/or registers, and/or other sizes of fields and/or registers, etc. Many variations are possible. For instance, implied registers may be used instead of explicitly specified registers and/or fields of the instruction and/or explicitly specified registers and/or fields may be used instead of implied registers and/or fields. Other variations are also possible.

As described herein, in one aspect, a single instruction (e.g., a single architected machine instruction at the hardware/software interface, e.g., a Vector Unpack Zoned Low instruction) is provided to unpack a signed packed decimal number. This instruction is, for instance, a hardware instruction defined in an instruction set architecture (ISA) that directly performs an unpack operation, including, for instance, converting, writing to a register and/or validity checking. Processing is faster and more efficient than a program that performs an unpack operation and the operations that are employed. The complexity of the program related to an unpack operation is reduced. Further, performance of the operations, and thus, the processor, is improved. The hardware instruction execution reduces execution times and improves performance.

In one embodiment, the Vector Unpack Zoned High and Vector Unpack Zoned Low instructions may be used together to unpack a signed packed decimal format operand in a vector register into a zoned decimal format operand in two vector registers with the high data unsigned and the low data signed. Either or both instructions can check the validity of the digits and sign code of the signed packed decimal format source.

One or more aspects of the present invention are inextricably tied to computer technology and facilitate processing within a computer, improving performance thereof. The use of a single architected machine instruction to perform a pack or unpack operation improves performance within the computing environment by reducing complexity, reducing use of resources and increasing processing speed. The data and/or instruction(s) may be used in many technical fields, such as in computer processing, medical processing, engineering, automotive technologies, manufacturing, etc. By providing optimizations in packing/unpacking the data, these technical fields are improved by reducing execution time.

Further details of one embodiment of facilitating processing within a computing environment, as it relates to one or more aspects of the present invention, are described with reference to FIGS. 7A-7B.

Referring to FIG. 7A, in one embodiment, an instruction to perform a conversion between one decimal format and another decimal format is executed 700. The one decimal format or the other decimal format is a zoned decimal format 702. The executing includes obtaining a value from at least one register specified using the instruction 704, converting at least a portion of the value from the one decimal format to the other decimal format different from the one decimal format to provide a converted result 706, and writing a result obtained from the converted result into a single register specified using the instruction 708.

As an example, the one decimal format is the zoned decimal format and the other decimal format is a packed decimal format 710.

In one example, the obtaining the value includes obtaining a first value from a first vector register specified using at least one field of the instruction 712, obtaining a second value from a second vector register specified using at least one field of the instruction 714, and concatenating the first value and the second value to obtain the value 716.

Referring to FIG. 7B, in one example, the writing includes determining a number of digits of the converted result to be written as the result 720, selecting the determined number of digits of the converted result to be written as the result 722, and writing the selected determined number of digits into the single register 724.

In one example, the determining the number of digits includes checking a control specified using the instruction 726. Further, as one example, the single register is a single vector register 728.

As another example, the one decimal format is a packed decimal format, and the other decimal format is the zoned decimal format 730. In one example, the converting the at least a portion of the value includes converting selected digits of the value to obtain the converted result 732, and the selected digits include, for instance, a leftmost fifteen digits of the value 734. As a further example, the selected digits include a rightmost sixteen digits of the value 736, and the converting includes converting a sign of the value 738.

In one example, the writing includes writing the converted result to a selected portion of the single register, the single register being a vector register 740.

By using a single instruction to perform the packing or unpacking operations, performance is improved, and utilization of resources is reduced. By using a single architected instruction to perform the packing (e.g., concatenating, converting, writing, validity checking and/or condition code setting) or unpacking (e.g., converting, writing and/or validity checking) operations, certain tasks may be performed, such as the packing or unpacking operations, much more efficiently than using a software paradigm. The packing or unpacking operations are performed much faster, reducing execution time, and improving processor and/or overall system performance.

Other variations and embodiments are possible.

Figure 8A:
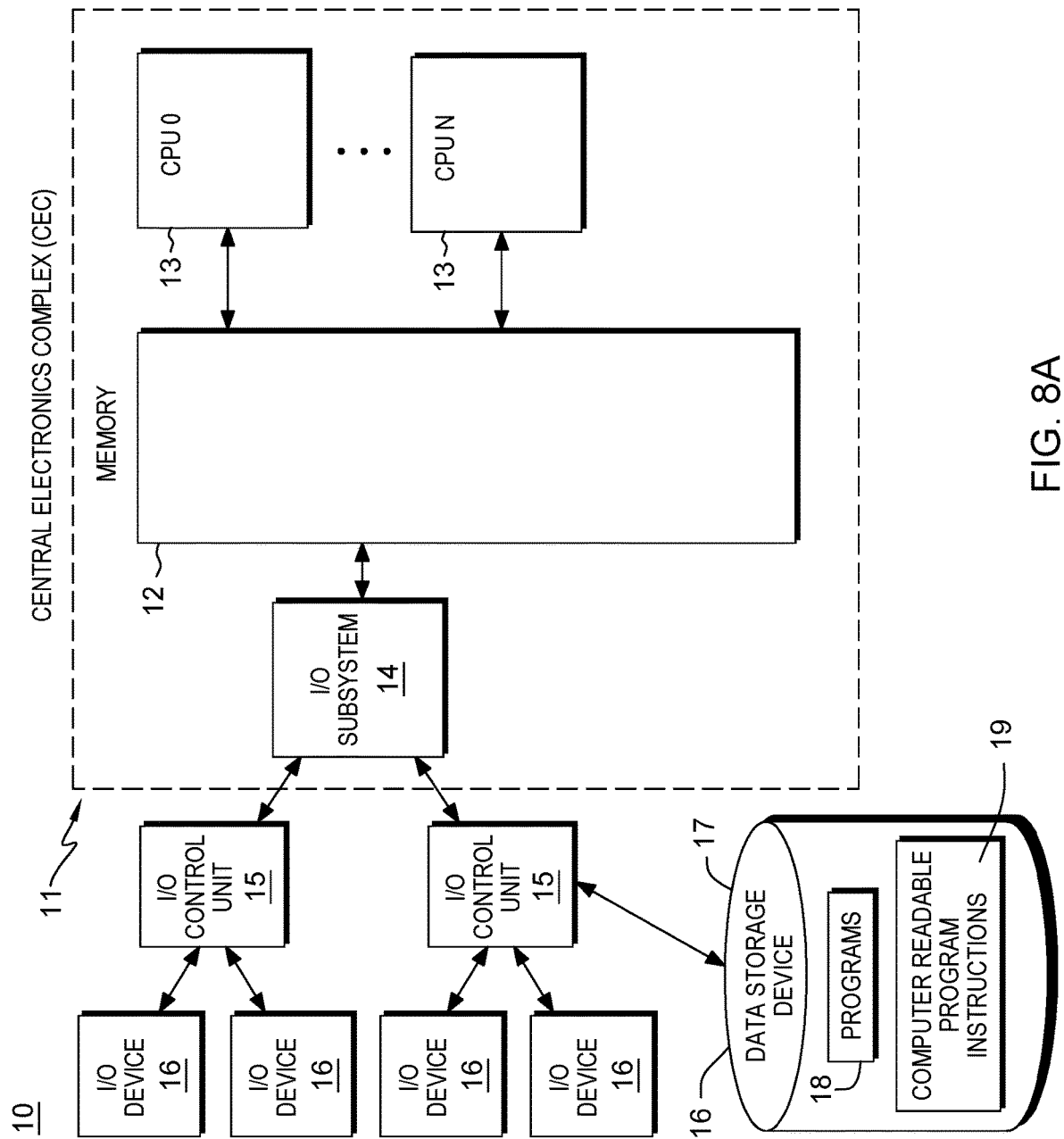
FIG. 8A depicts another example of a computing environment to incorporate and use one or more aspects of the present invention.

Aspects of the present invention may be used by many types of computing environments. Another example of a computing environment to incorporate and use one or more aspects of the present invention is described with reference to FIG. 8A. As an example, the computing environment of FIG. 8A is based on the z/Architecture® hardware architecture offered by International Business Machines Corporation, Armonk, N.Y. The z/Architecture hardware architecture, however, is only one example architecture. Again, the computing environment may be based on other architectures, including, but not limited to, the Intel® x86 architectures, other architectures of International Business Machines Corporation, and/or architectures of other companies. Intel is a trademark or registered trademark of Intel Corporation or its subsidiaries in the United States and other countries.

In one example, a computing environment 10 includes a central electronics complex (CEC) 11. Central electronics complex 11 includes a plurality of components, such as, for instance, a memory 12 (a.k.a., system memory, main memory, main storage, central storage, storage) coupled to one or more processors (a.k.a., central processing units (CPUs)) 13 and to an input/output (I/O) subsystem 14.

I/O subsystem 14 can be a part of the central electronics complex or separate therefrom. It directs the flow of information between main storage 12 and input/output control units 15 and input/output (I/O) devices 16 coupled to the central electronics complex.

Many types of I/O devices may be used. One particular type is a data storage device 17. Data storage device 17 can store one or more programs 18, one or more computer readable program instructions 19, and/or data, etc. The computer readable program instructions can be configured to carry out functions of embodiments of aspects of the invention.

Central electronics complex 11 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central electronics complex 11. Examples include, but are not limited to: microcode, device drivers, redundant processing units, external disk drive arrays, RAID systems, tape drives, and data archival storage systems, etc.

Further, central electronics complex 11 can be operational with numerous other general-purpose or special-purpose computing system environments or configurations. Examples of well-known computing systems, environments, and/or configurations that may be suitable for use with central electronics complex 11 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 8C:
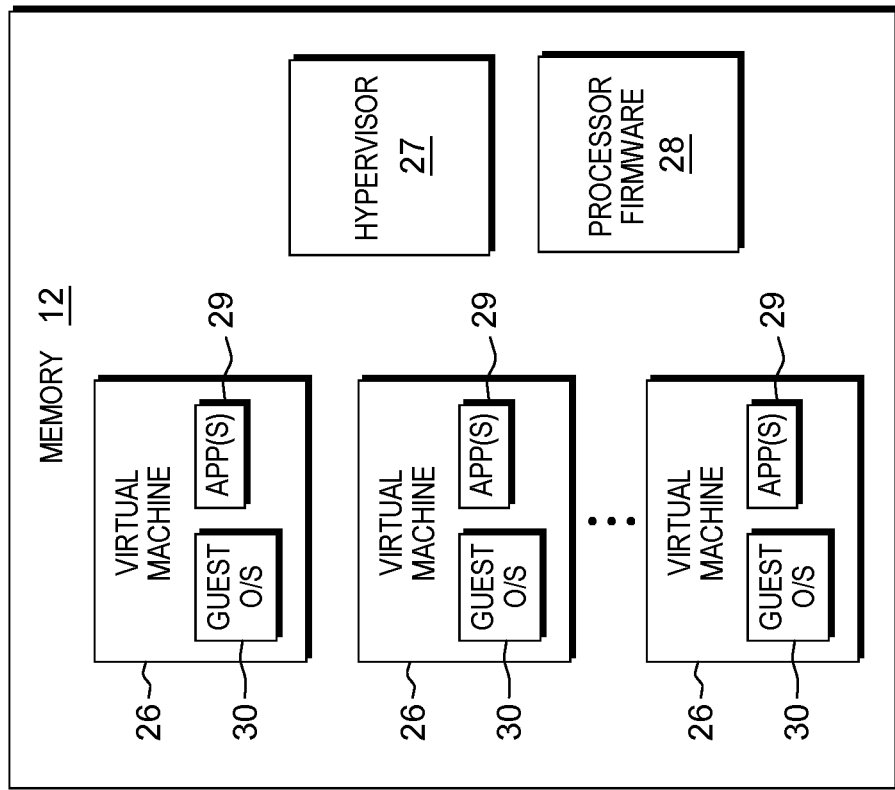
FIG. 8C depicts another example of further details of a memory of FIG. 8A, in accordance with one or more aspects of the present invention.
Figure 8B:
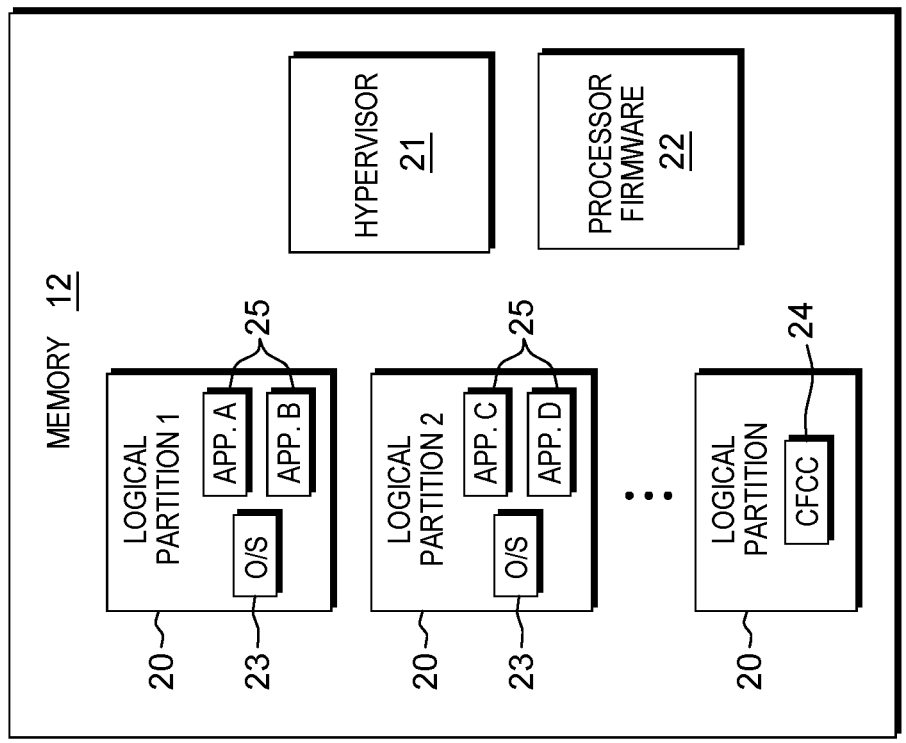
FIG. 8B depicts one example of further details of a memory of FIG. 8A, in accordance with one or more aspects of the present invention.

Central electronics complex 11 provides in one or more embodiments logical partitioning and/or virtualization support. In one embodiment, as shown in FIG. 8B, memory 12 includes, for example, one or more logical partitions 20, a hypervisor 21 that manages the logical partitions, and processor firmware 22. One example of hypervisor 21 is the Processor Resource/System Manager (PR/SM'), offered by International Business Machines Corporation, Armonk, N.Y. As used herein, firmware includes, e.g., the microcode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware. PR/SM is a trademark or registered trademark of International Business Machines Corporation in at least one jurisdiction.

Each logical partition 20 is capable of functioning as a separate system. That is, each logical partition can be independently reset, run a guest operating system 23 such as the z/OS® operating system, offered by International Business Machines Corporation, Armonk, N.Y., or other control code 24, such as coupling facility control code (CFCC), and operate with different programs 25. An operating system or application program running in a logical partition appears to have access to a full and complete system, but in reality, only a portion of it is available. Although the z/OS operating system is offered as an example, other operating systems offered by International Business Machines Corporation and/or other companies may be used in accordance with one or more aspects of the present invention.

Memory 12 is coupled to CPUs 13 (FIG. 8A), which are physical processor resources that can be allocated to the logical partitions. For instance, a logical partition 20 includes one or more logical processors, each of which represents all or a share of a physical processor resource 13 that can be dynamically allocated to the logical partition.

In yet a further embodiment, the central electronics complex provides virtual machine support (either with or without logical partitioning support). As shown in FIG. 8C, memory 12 of central electronics complex 11 includes, for example, one or more virtual machines 26, a virtual machine manager, such as a hypervisor 27, that manages the virtual machines, and processor firmware 28. One example of hypervisor 27 is the z/VM® hypervisor, offered by International Business Machines Corporation, Armonk, N.Y. The hypervisor is sometimes referred to as a host. z/VM is a trademark or registered trademark of International Business Machines Corporation in at least one jurisdiction.

The virtual machine support of the central electronics complex provides the ability to operate large numbers of virtual machines 26, each capable of operating with different programs 29 and running a guest operating system 30, such as the Linux® operating system. Each virtual machine 26 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux® is used pursuant to a sublicense from the Linux Foundation, the exclusive licensee of Linus Torvalds, owner of the mark on a worldwide basis.

Figure 9A:
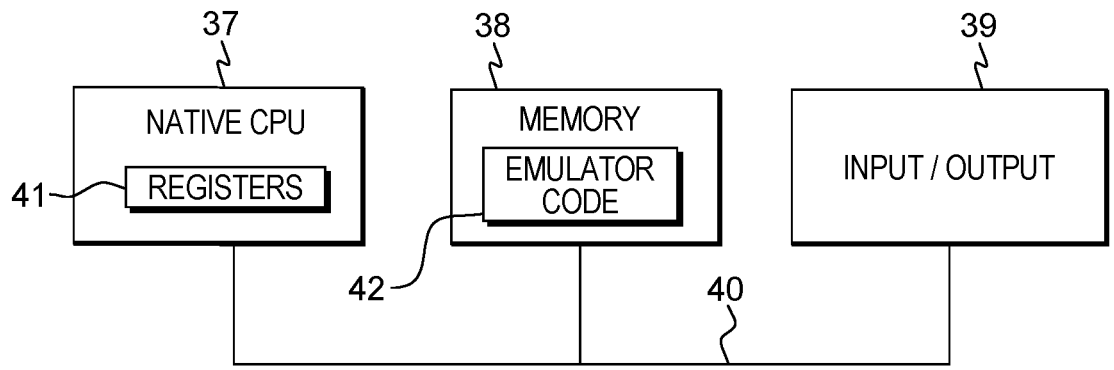
FIG. 9A depicts yet another example of a computing environment to incorporate and use one or more aspects of the present invention.

Another embodiment of a computing environment to incorporate and use one or more aspects of the present invention is described with reference to FIG. 9A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, N.Y.; an HP Superdome with Intel® Itanium® II processors offered by Hewlett Packard Co., Palo Alto, Calif.; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Itanium is a trademark or registered trademark of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture hardware architecture, such as PowerPC processors, HP Superdome servers or others, to emulate the z/Architecture hardware architecture and to execute software and instructions developed based on the z/Architecture hardware architecture.

Figure 9B:
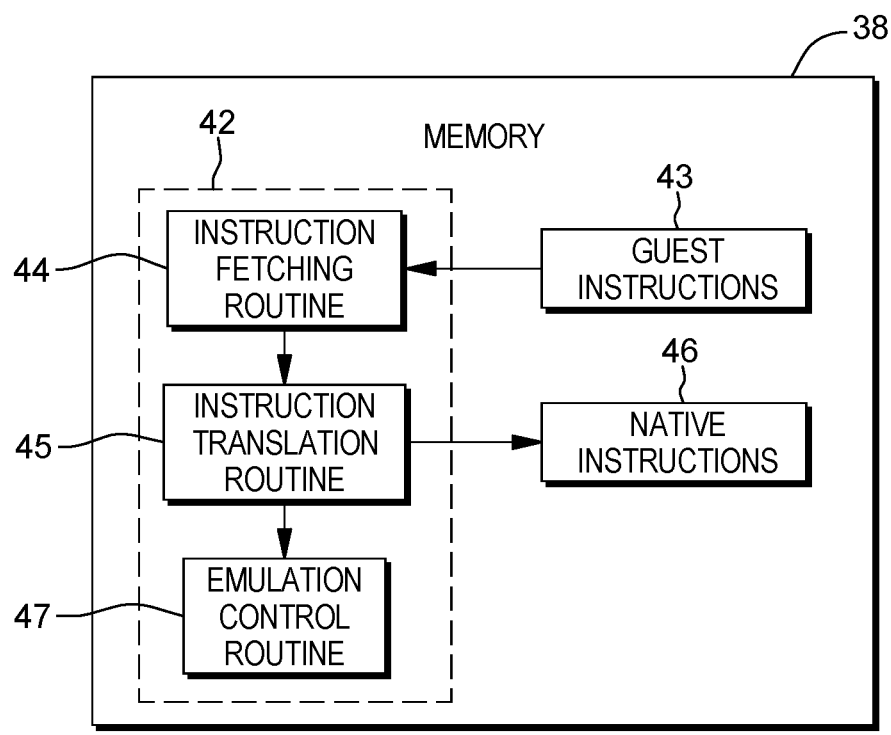
FIG. 9B depicts further details of the memory of FIG. 9A, in accordance with one or more aspects of the present invention.

Further details relating to emulator code 42 are described with reference to FIG. 9B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture hardware architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

Instructions that may be emulated include the Vector Pack Zoned Register instruction, the Vector Unpack Zoned High instruction and the Vector Unpack Zoned Low instruction described herein, in accordance with aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment.

Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
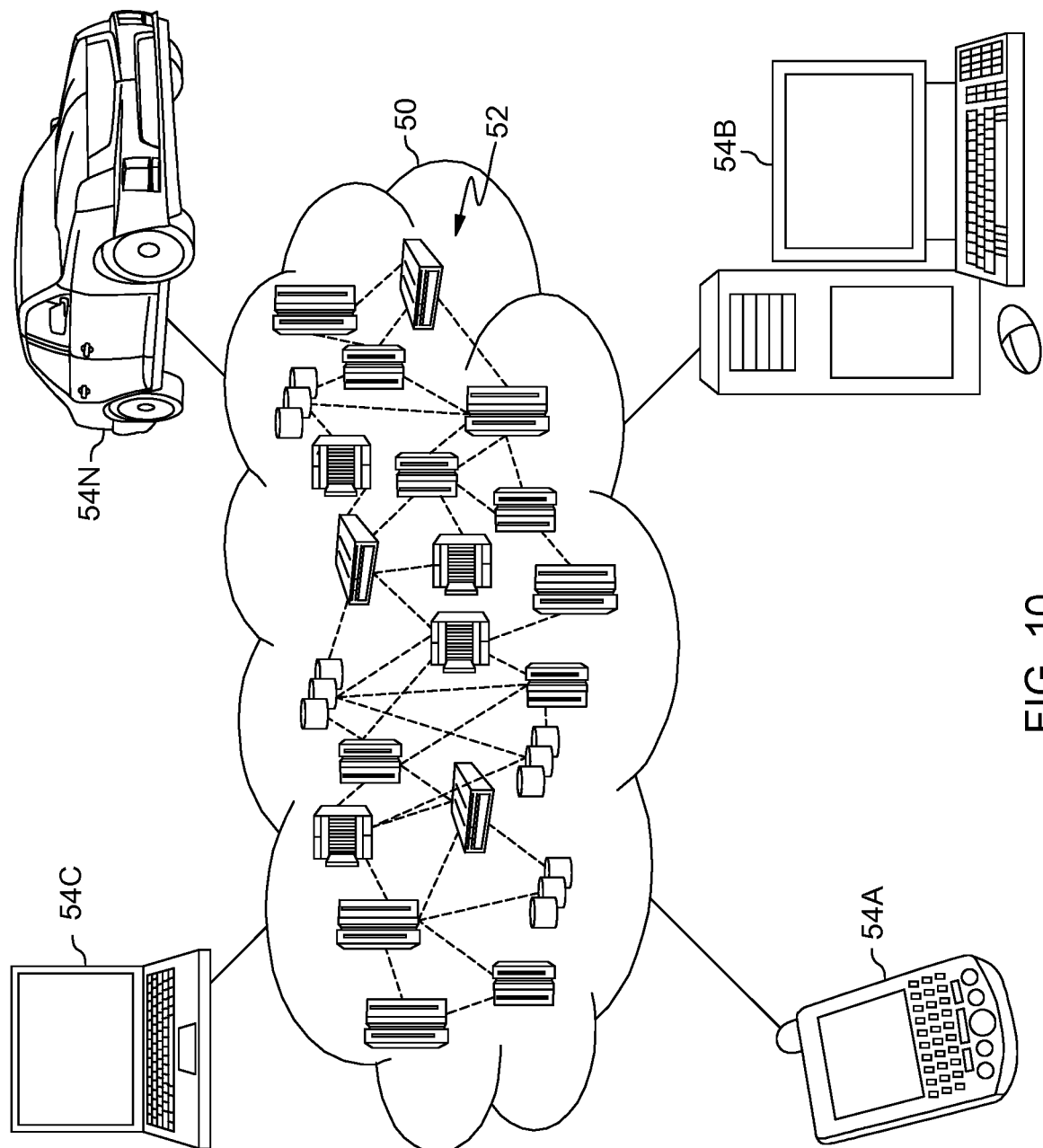
FIG. 10 depicts one embodiment of a cloud computing environment, in accordance with one or more aspects of the present invention.

Referring now to FIG. 10, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 11:
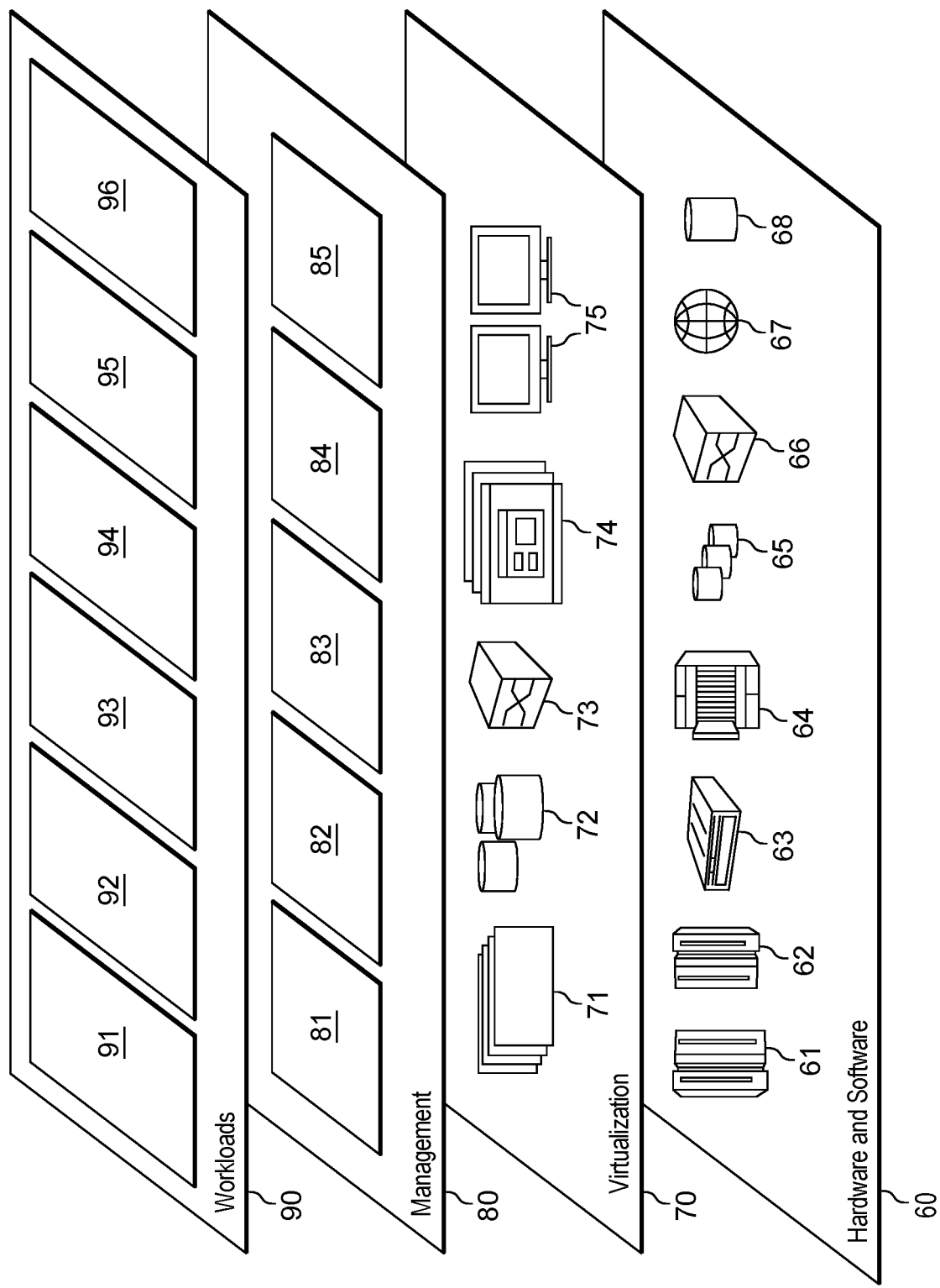
FIG. 11 depicts one example of abstraction model layers, in accordance with one or more aspects of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and vector pack and unpack processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions or operations may be used. Additionally, different types of registers and/or different register may be used. Further, other formats used to represent numbers may be employed. As an example, aspects of the invention can be used for the numeric portion of separate signed zoned decimal formats, unsigned packed decimal formats, and/or other formats. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:

one or more computer readable storage media and program instructions collectively stored on the one or more computer readable storage media to perform a method comprising:
  executing an instruction to perform a conversion between decimal formats, wherein one of the decimal formats is a zoned decimal format, and wherein the executing includes:
    obtaining a value from at least one register specified using the instruction;
    converting at least a portion of the value from one decimal format to another decimal format different from the one decimal format to provide a converted result;
    writing a result obtained from the converted result into a single register specified using the instruction;
    obtaining, using a field of the instruction, at least one validity control, the at least one validity control to determine whether one or more particular validity checks relating to the instruction are to be performed, the at least one validity control including a digit validation control and a sign validation control; and
    performing, as part of executing the instruction, the one or more particular validity checks based on the at least one validity control indicating the one or more particular validity checks are to be performed, wherein the performing the one or more particular validity checks includes checking a sign code of a source value of the instruction for a general operand data exception based on the digit validation control being set to a selected value to indicate validity checking and the sign validation control being set to a chosen value to indicate validity checking.

2. The computer program product of claim 1, wherein the one decimal format is the zoned decimal format, and the other decimal format is a packed decimal format.

3. The computer program product of claim 2, wherein the obtaining the value comprises:
  obtaining a first value from a first vector register specified using at least one field of the instruction;
  obtaining a second value from a second vector register specified using at least one field of the instruction; and
  concatenating the first value and the second value to obtain the value.

4. The computer program product of claim 2, wherein the writing comprises:
  determining a number of digits of the converted result to be written as the result;
  selecting the determined number of digits of the converted result to be written as the result; and
  writing the selected determined number of digits into the single register.

5. The computer program product of claim 4, wherein the determining the number of digits comprises checking a control specified using the instruction, and the single register is a single vector register.

6. The computer program product of claim 2, wherein based on the digit validation control being set to a value different from the selected value indicating validity checking for the general operand data exception, the sign code of the source vector is checked for validity for setting a condition code resulting from execution of the instruction.

7. The computer program product of claim 2, wherein based on the sign validation control being set to a value different from the chosen value indicating validity checking for the general operand data exception, the sign code of the source vector is checked for validity for setting a condition code resulting from execution of the instruction.

8. The computer program product of claim 1, wherein the one decimal format is a packed decimal format and wherein the other decimal format is the zoned decimal format.

9. The computer program product of claim 8, wherein the converting at least a portion of the value comprises converting selected digits of the value to obtain the converted result.

10. The computer program product of claim 9, wherein the selected digits comprise a leftmost fifteen digits of the value.

11. The computer program product of claim 9, wherein the selected digits comprise a rightmost sixteen digits of the value, and wherein the converting further includes converting a sign of the value.

12. The computer program product of claim 9, wherein the writing comprises writing the converted result to a selected portion of the single register, the single register being a vector register.

13. A computer system for facilitating processing within a computing environment, the computer system comprising:
  a memory; and
  a processor in communication with the memory, wherein the computer system is configured to perform a method, said method comprising:
    executing an instruction to perform a conversion between decimal formats, wherein one of the decimal formats is a zoned decimal format, and wherein the executing includes:
      obtaining a value from at least one register specified using the instruction;
      converting at least a portion of the value from one decimal format to another decimal format different from the one decimal format to provide a converted result;
      writing a result obtained from the converted result into a single register specified using the instruction;
      obtaining, using a field of the instruction, at least one validity control, the at least one validity control to determine whether one or more particular validity checks relating to the instruction are to be performed, the at least one validity control including a digit validation control and a sign validation control; and
      performing, as part of executing the instruction, the one or more particular validity checks based on the at least one validity control indicating the one or more particular validity checks are to be performed, wherein the performing the one or more particular validity checks includes checking a sign code of a source value of the instruction for a general operand data exception based on the digit validation control being set to a selected value to indicate validity checking and the sign validation control being set to a chosen value to indicate validity checking.

14. The computer system of claim 13, wherein the one decimal format is the zoned decimal format, and the other decimal format is a packed decimal format.

15. The computer system of claim 14, wherein the obtaining the value comprises:
  obtaining a first value from a first vector register specified using at least one field of the instruction;

obtaining a second value from a second vector register specified using at least one field of the instruction; and
concatenating the first value and the second value to obtain the value.

16. The computer system of claim 14, wherein the writing comprises:
  determining a number of digits of the converted result to be written as the result;
  selecting the determined number of digits of the converted result to be written as the result; and
  writing the selected determined number of digits into the single register.

17. The computer system of claim 13, wherein the one decimal format is a packed decimal format and wherein the other decimal format is the zoned decimal format.

18. A computer-implemented method of facilitating processing within a computing environment, the computer-implemented method comprising:
  executing an instruction to perform a conversion between decimal formats, wherein one of the decimal formats is a zoned decimal format, and wherein the executing includes:
    obtaining a value from at least one register specified using the instruction;
    converting at least a portion of the value from one decimal format to another decimal format different from the one decimal format to provide a converted result;
    writing a result obtained from the converted result into a single register specified using the instruction;
    obtaining, using a field of the instruction, at least one validity control, the at least one validity control to determine whether one or more particular validity checks relating to the instruction are to be performed, the at least one validity control including a digit validation control and a sign validation control; and
    performing, as part of executing the instruction, the one or more particular validity checks based on the at least one validity control indicating the one or more particular validity checks are to be performed, wherein the performing the one or more particular validity checks includes checking a sign code of a source value of the instruction for a general operand data exception based on the digit validation control being set to a selected value to indicate validity checking and the sign validation control being set to a chosen value to indicate validity checking.

19. The computer-implemented method of claim 18, wherein the one decimal format is the zoned decimal format, and the other decimal format is a packed decimal format.

20. The computer-implemented method of claim 19, wherein the obtaining the value comprises:
  obtaining a first value from a first vector register specified using at least one field of the instruction;
  obtaining a second value from a second vector register specified using at least one field of the instruction; and
  concatenating the first value and the second value to obtain the value.

21. The computer-implemented method of claim 19, wherein the writing comprises:
  determining a number of digits of the converted result to be written as the result;
  selecting the determined number of digits of the converted result to be written as the result; and
  writing the selected determined number of digits into the single register.

22. The computer-implemented method of claim 18, wherein the one decimal format is a packed decimal format and wherein the other decimal format is the zoned decimal format.

23. A computer program product for facilitating processing within a computing environment, the computer program product comprising:
  one or more computer readable storage media and program instructions collectively stored on the one or more computer readable storage media to perform a method comprising:
    executing a vector unpack zoned high instruction to perform an unpack operation, the unpack operation including a conversion between a signed packed decimal format and a zoned decimal format and validity checking, wherein the executing includes:
      obtaining a value from at least one register specified using the instruction;
      converting selected leftmost digits of the value from the signed packed decimal format to the zoned decimal format to provide a converted result;
      writing a result obtained from the converted result into a single register specified using the instruction;
      obtaining, using a field of the instruction, a digit validation control and a sign validation control; and
      performing, as part of executing the vector unpack zoned high instruction, a sign code validity check of an input value of the instruction for a general operand data exception based on the digit validation control being set to a selected value to indicate validity checking and the sign validation control being set to a chosen value to indicate validity checking.

24. The computer program product of claim 23, wherein the selected digits comprise a leftmost fifteen digits of the value.

25. A computer program product for facilitating processing within a computing environment, the computer program product comprising:
  one or more computer readable storage media and program instructions collectively stored on the one or more computer readable storage media to perform a method comprising:
    executing a vector unpack zoned low instruction to perform an unpack operation, the unpack operation including a conversion between a signed packed decimal format and a zoned decimal format and validity checking, wherein the executing includes:
      obtaining a value from at least one register specified using the instruction;
      converting selected rightmost digits of the value from the signed packed decimal format to the zoned decimal format to provide a converted result;
      writing a result obtained from the converted result into a single register specified using the instruction;
      obtaining, using a field of the instruction, a digit validation control and a sign validation control; and
      performing, as part of executing the vector unpack zoned low instruction, a sign code validity check of an input value of the instruction for a general operand data exception based on the digit validation control being set to a selected value to indicate validity checking and the sign validation control being set to a chosen value to indicate validity checking.

\* \* \* \* \*